US012529474B2

(12) United States Patent
Rink et al.

(10) Patent No.: US 12,529,474 B2
(45) Date of Patent: Jan. 20, 2026

(54) ELECTRONICS HOUSING ASSEMBLY WITH IMPROVED HEAT DISSIPATION

(71) Applicant: ABL IP Holding LLC, Atlanta, GA (US)

(72) Inventors: Matthew Rink, Decatur, GA (US); Paul Tashian, Suwanee, GA (US); Grace Minton, Atlanta, GA (US); Eyosias Gedion, Atlanta, GA (US); Christian Charnas, Atlanta, GA (US); Charles Richard Vasquez, Atlanta, GA (US); Lucas Van Dyke, Johns Creek, GA (US)

(73) Assignee: ABL IP Holding LLC, Atlanta, GA (US)

( * ) Notice: Subject to any disclaimer, the term of this patent is extended or adjusted under 35 U.S.C. 154(b) by 22 days.

(21) Appl. No.: 18/766,304

(22) Filed: Jul. 8, 2024

(65) Prior Publication Data

US 2026/0009529 A1 Jan. 8, 2026

(51) Int. Cl.

*F21V 29/78* (2015.01)
*F21V 23/00* (2015.01)
*F21Y 105/18* (2016.01)
*F21Y 113/00* (2016.01)
*F21Y 115/10* (2016.01)

(52) U.S. Cl.

CPC ............ *F21V 29/78* (2015.01); *F21V 23/009* (2013.01); *F21Y 2105/18* (2016.08); *F21Y 2113/00* (2013.01); *F21Y 2115/10* (2016.08)

(58) Field of Classification Search

CPC .............................. F21V 29/78; F21V 23/009
See application file for complete search history.

(56) References Cited

U.S. PATENT DOCUMENTS

| | | | | |
|---|---|---|---|---|
| 8,602,599 | B2 * | 12/2013 | Zimmer | F21V 7/0008 362/249.02 |
| 11,655,974 | B2 * | 5/2023 | Chavan | F21V 29/89 362/373 |
| 2008/0080196 | A1 * | 4/2008 | Ruud | F21V 31/03 362/373 |
| 2011/0044050 | A1 * | 2/2011 | Chiu | F21V 29/773 362/294 |
| 2013/0221846 | A1 * | 8/2013 | Alexiou | F21V 29/75 315/51 |
| 2013/0293106 | A1 * | 11/2013 | Maxik | F21V 29/507 362/373 |
| 2013/0329434 | A1 * | 12/2013 | Packard | F21V 17/002 362/374 |
| 2017/0045214 | A1 * | 2/2017 | Johnson | F21V 3/061 |
| 2018/0003370 | A1 * | 1/2018 | Mandlekar | F21V 29/85 |
| 2019/0242569 | A1 * | 8/2019 | Jiang | F21K 9/237 |

* cited by examiner

*Primary Examiner* — Bryon T Gyllstrom
(74) *Attorney, Agent, or Firm* — Kilpatrick Townsend & Stockton LLP

(57) ABSTRACT

Embodiments of the present invention provide electronics housings that house drivers and other electronics for powering/controlling light sources within a light fixture. The electronics housings are designed to physically isolate the electronics housed within and improve contact between the housing and the electronics to create direct thermal paths for heat dissipation. Heat sink fins may be provided on the electronics housings to create air passageways through which air can move to remove heat from the electronics housings and the light fixtures to which they are attached.

20 Claims, 31 Drawing Sheets

ELECTRONICS HOUSING ASSEMBLY WITH IMPROVED HEAT DISSIPATION

FIELD

The present invention relates to an electronics housing assembly designed to improve heat dissipation and to light fixtures incorporating such electronics housing assemblies.

BACKGROUND

Light emitting diodes ("LED") are commonly used in light fixtures and are powered by electronic components such as drivers. LED-based light fixtures generate a great deal of heat during operation, both from the LEDs themselves as well as the drivers that power them. Effective removal of such heat from the light fixtures is critical to maintaining the efficiency, operation, and longevity of the fixture components.

LED-based light fixtures often incorporate a mechanical heat sink located proximate the LED lighting unit and/or LED power supply unit to draw heat away from these components by conduction. The heat sink is exposed to ambient air and heat conducted to the heat sink dissipates over time via convection. However, the traditional arrangement of the electronic components (e.g., drivers) within the light fixture can detrimentally impact the fixture's ability to dissipate heat. For example, drivers are often arranged end-to-end or side-to-side in the fixture's driver housing such that heat from one driver impacts the thermal properties of an adjacent driver. Moreover, the shape of the driver housing in which the drivers are contained often prevents multiple surfaces of a driver from being in direct contact with the housing and thus impedes heat conduction. An electronics driver housing that better promotes heat dissipation would thus be desirable.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention provide electronics housings that house drivers and other electronics for powering/controlling light sources within a light fixture. The electronics housings are designed to physically isolate the electronics housed within and improve contact between the housing and the electronics to create direct thermal paths for heat dissipation. Heat sink fins may be provided on the electronics housings to create air passageways through which air can move to remove heat from the electronics housings and the light fixtures to which they are attached.

BRIEF DESCRIPTION OF THE DRAWINGS

Illustrative features of the present invention are described in detail below with reference to the following drawing figures.

DETAILED DESCRIPTION

Figure 1:
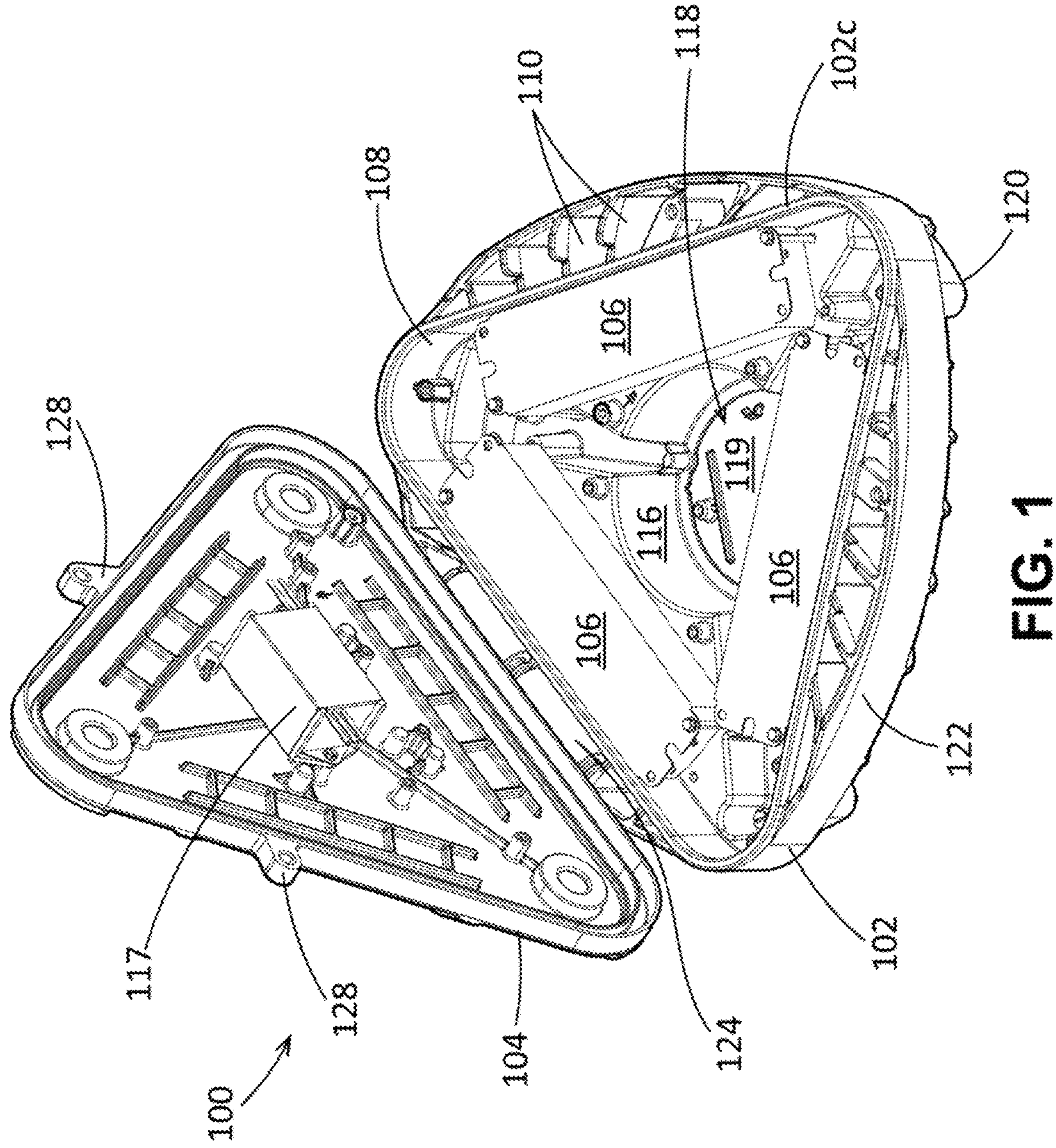
FIG. 1 illustrates a top perspective view of an embodiment of an electronics housing assembly with the top cover open.
Figure 2:
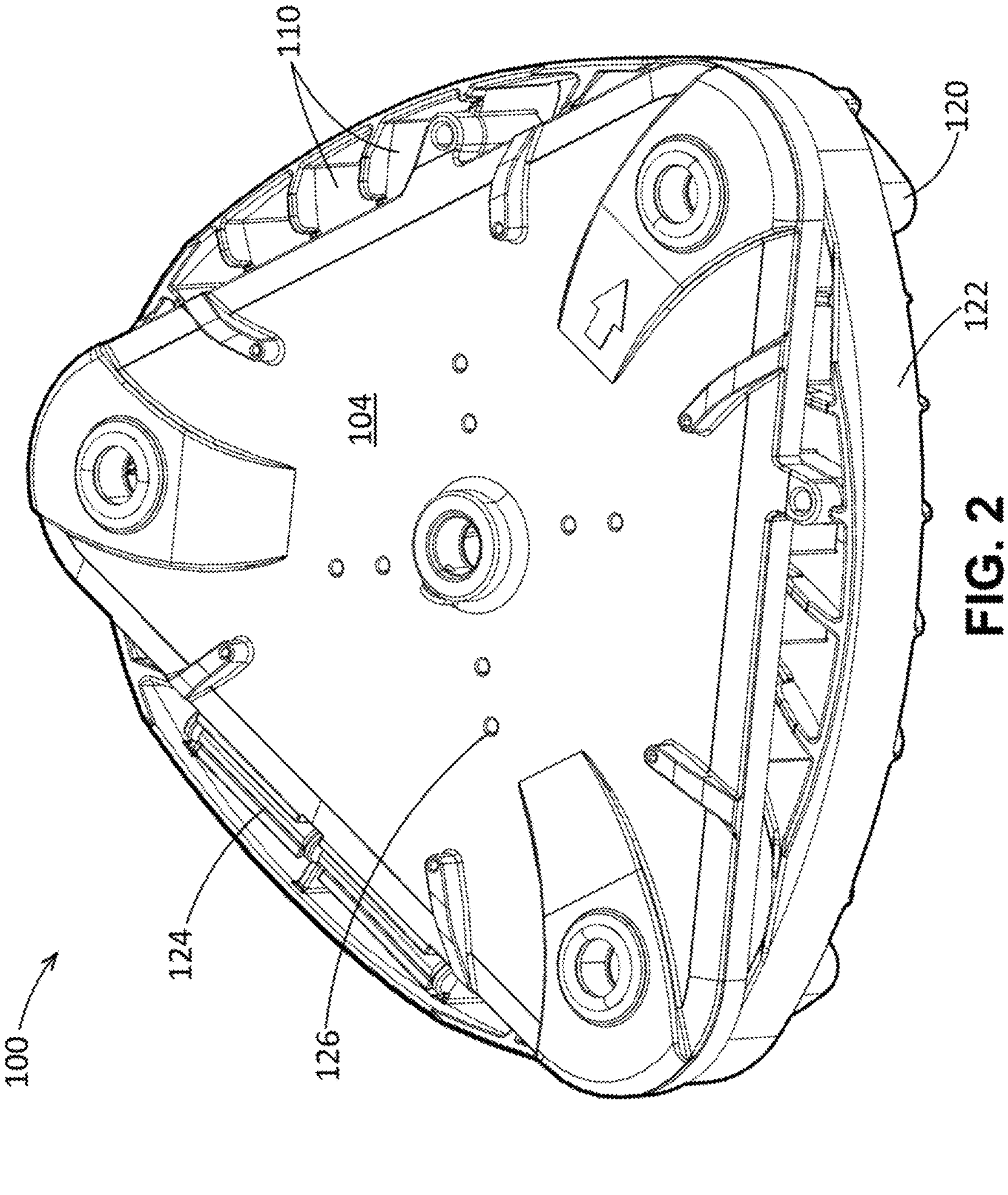
FIG. 2 illustrates a top perspective view of the electronics housing assembly of FIG. 1 with the top cover closed.
Figure 3:
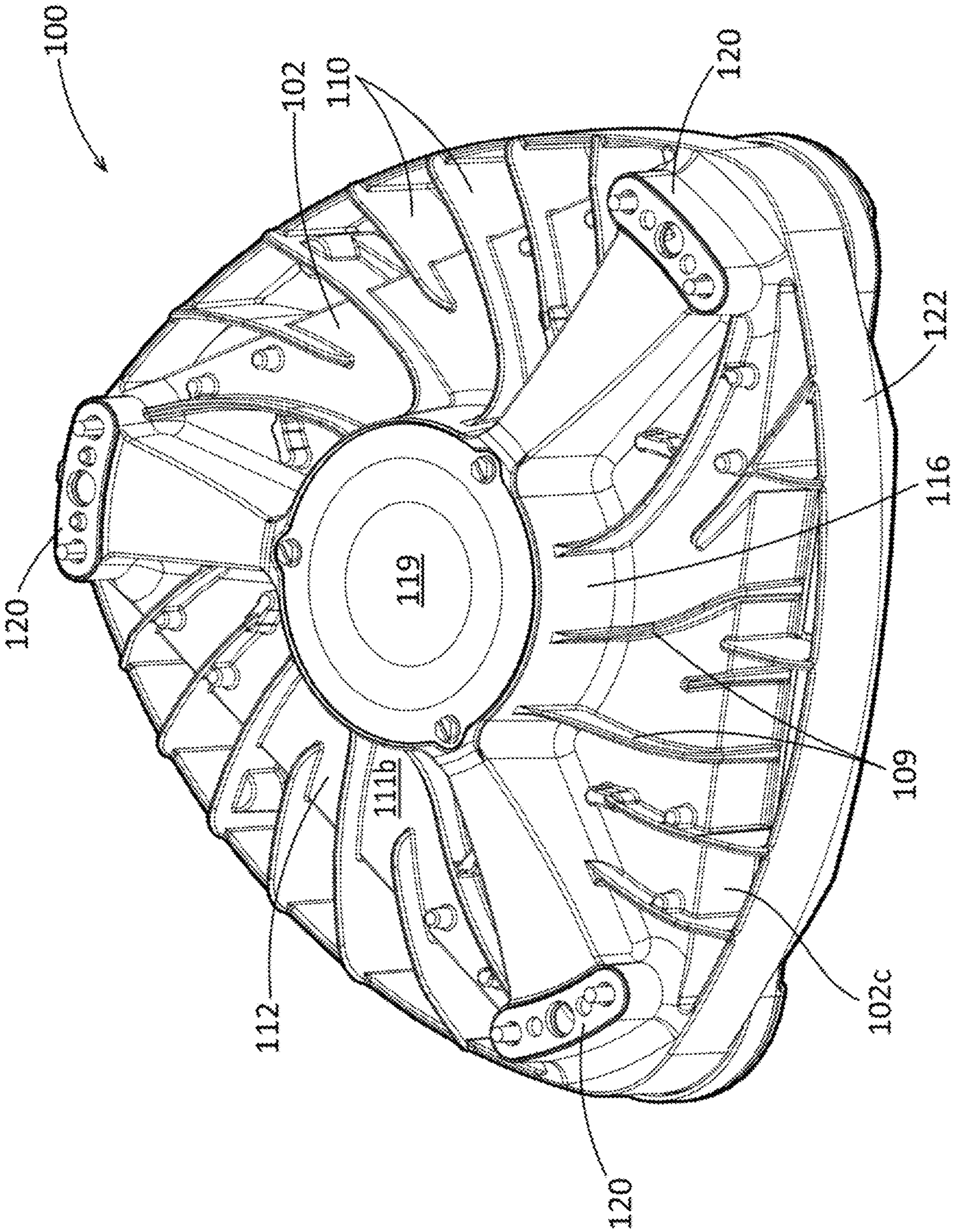
FIG. 3 illustrates a bottom perspective view of the electronics housing assembly of FIG. 2.
Figure 4:
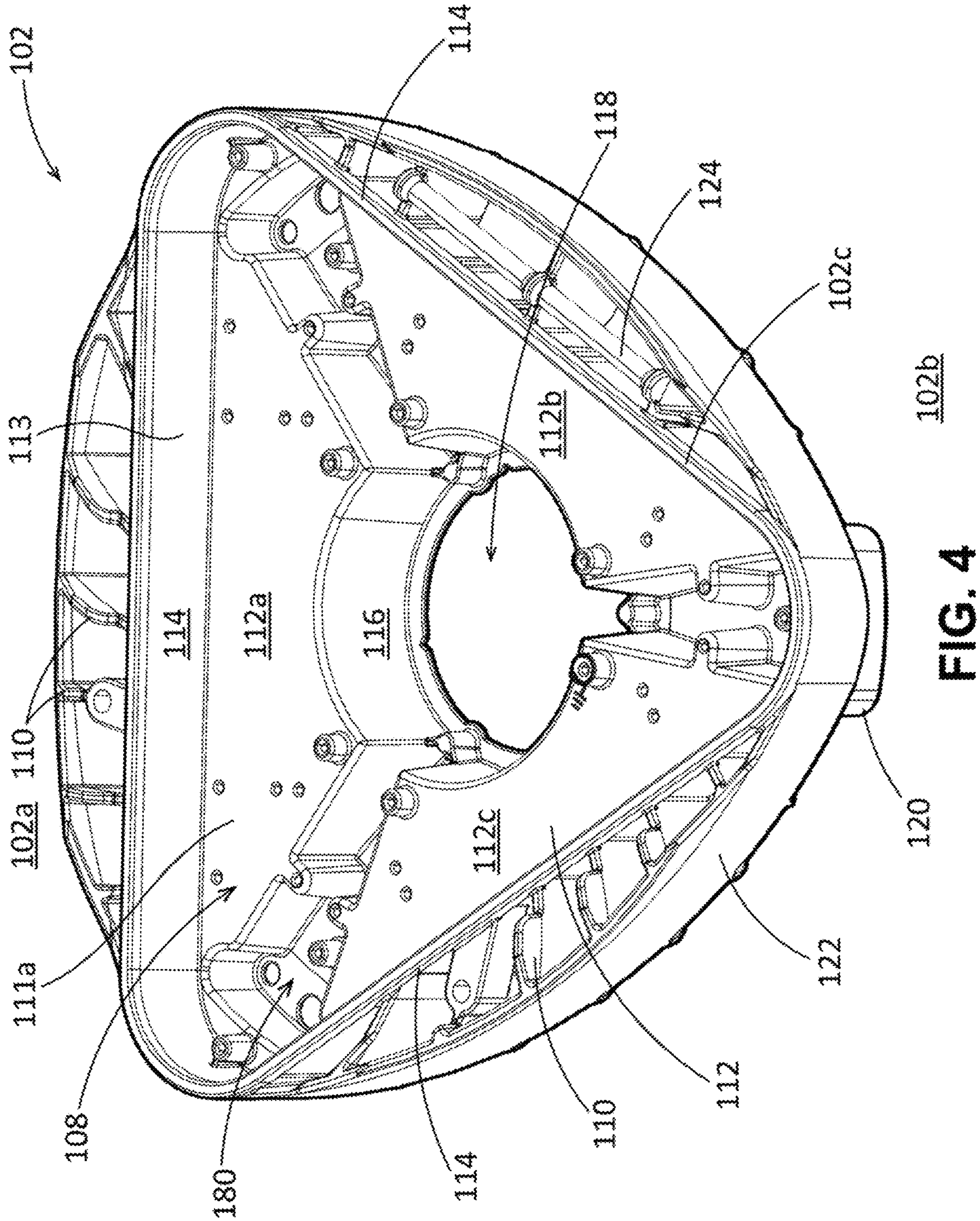
FIG. 4 illustrates a top perspective view of the electronics housing of the electronics housing assembly of FIGS. 1-3 in isolation.
Figure 5:
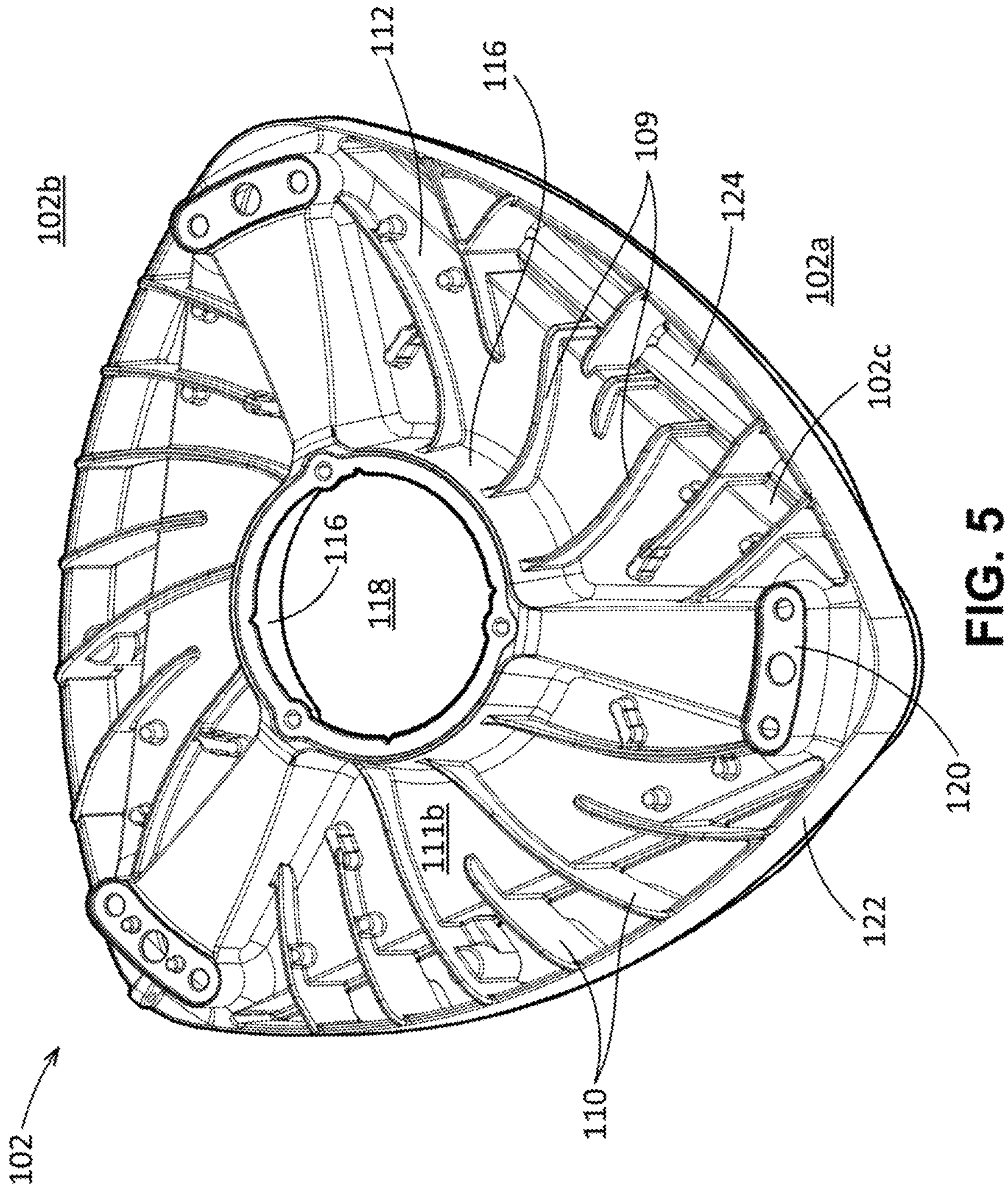
FIG. 5 illustrates a bottom perspective view of the electronics housing of FIG. 4.
Figure 6:
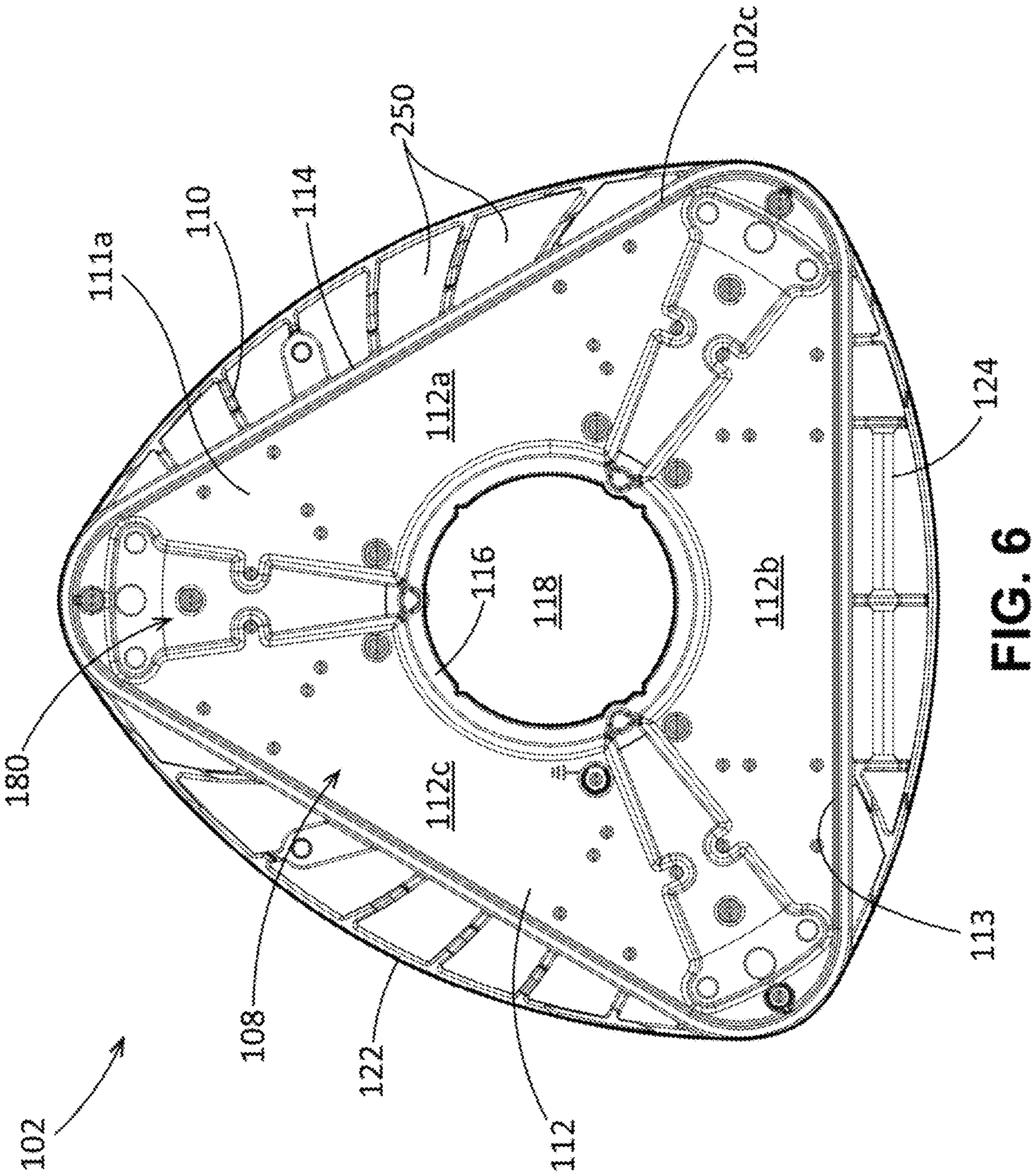
FIG. 6 illustrates a top plan view of the electronics housing of FIG. 4.
Figure 7:
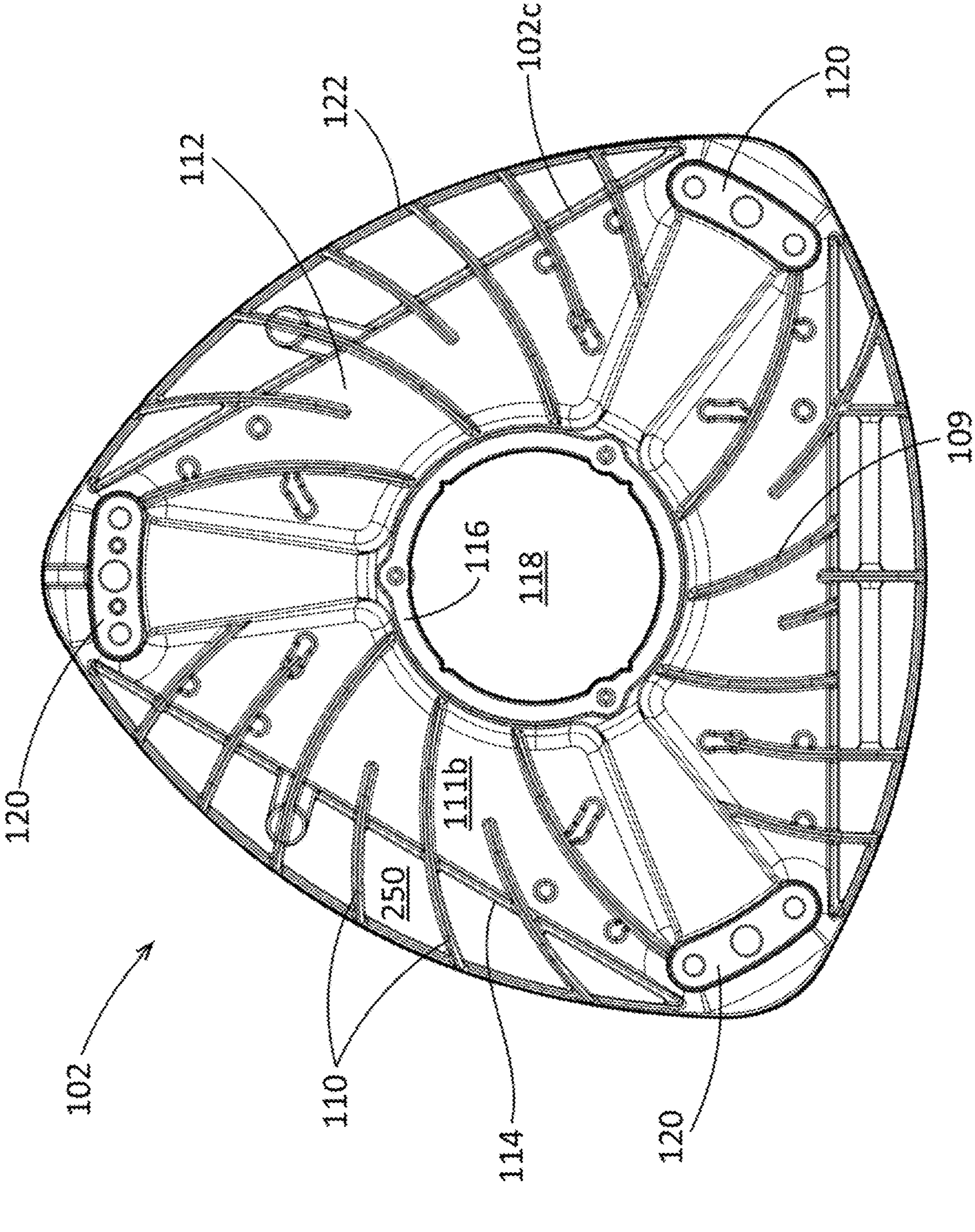
FIG. 7 illustrates a bottom plan view of the electronics housing of FIG. 4.
Figure 8:
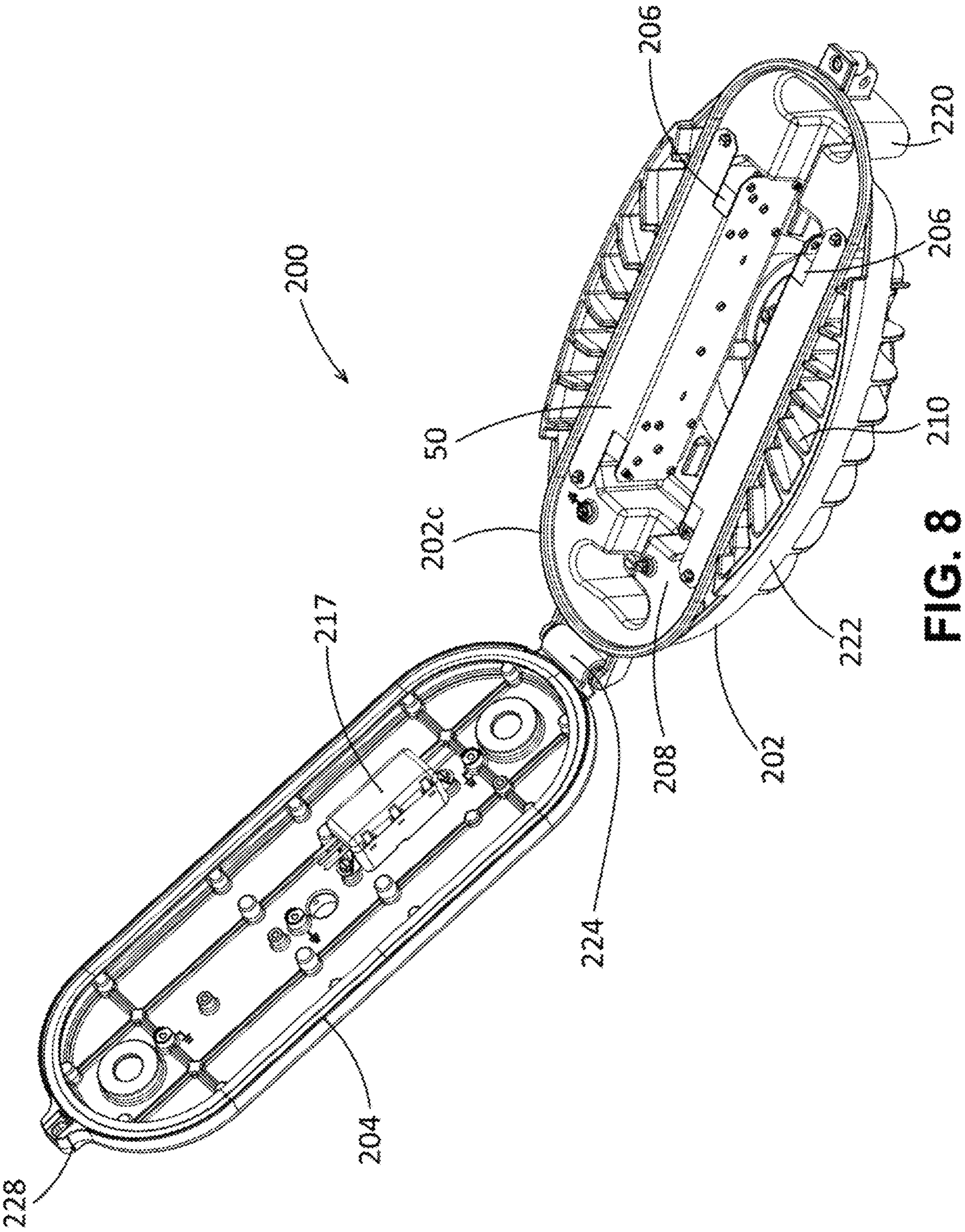
FIG. 8 illustrates a top perspective view of another embodiment of an electronics housing assembly with the top cover open.
Figure 9:
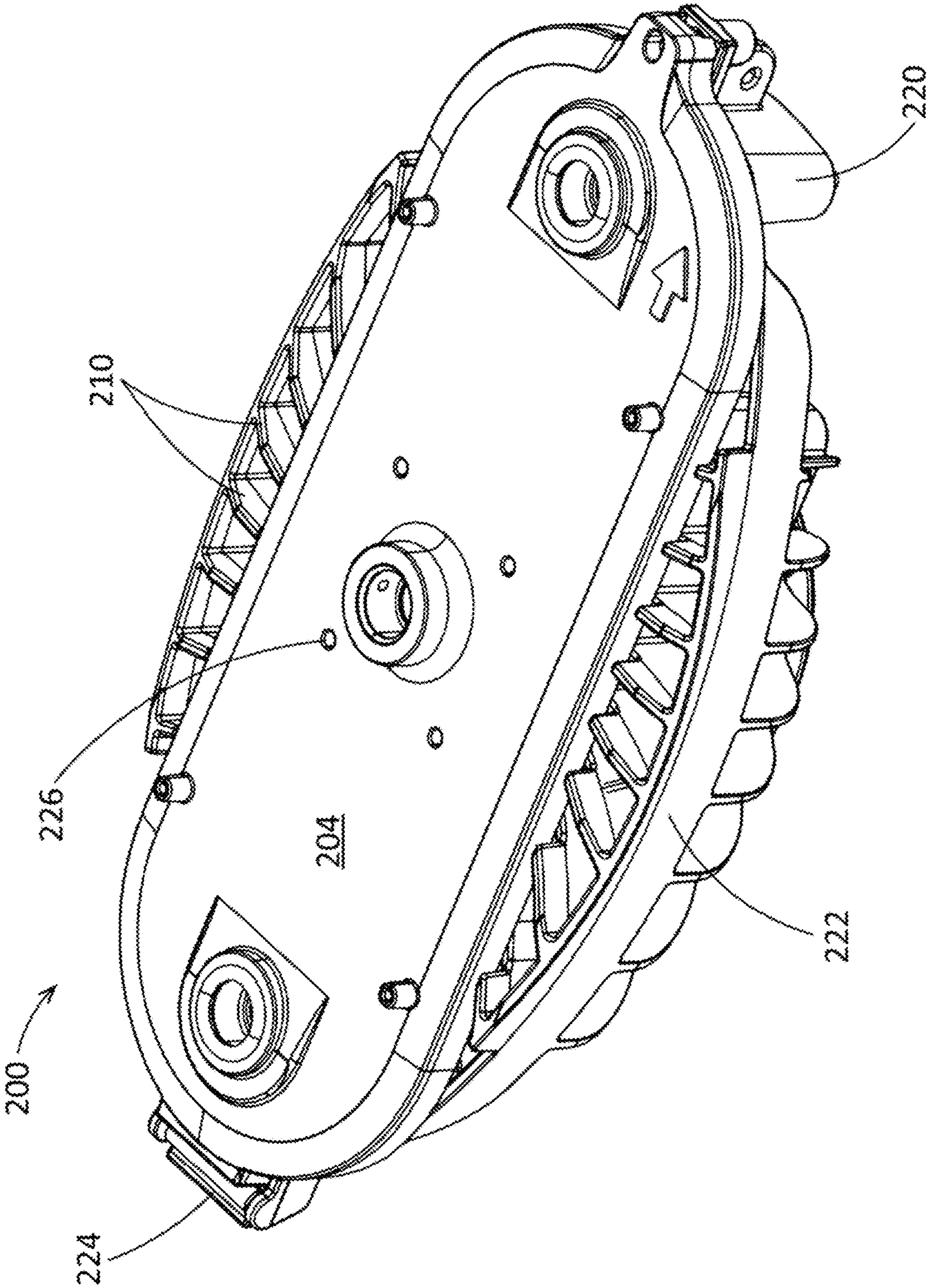
FIG. 9 illustrates a top perspective view of the electronics housing assembly of FIG. 8 with the top cover closed.
Figure 10:
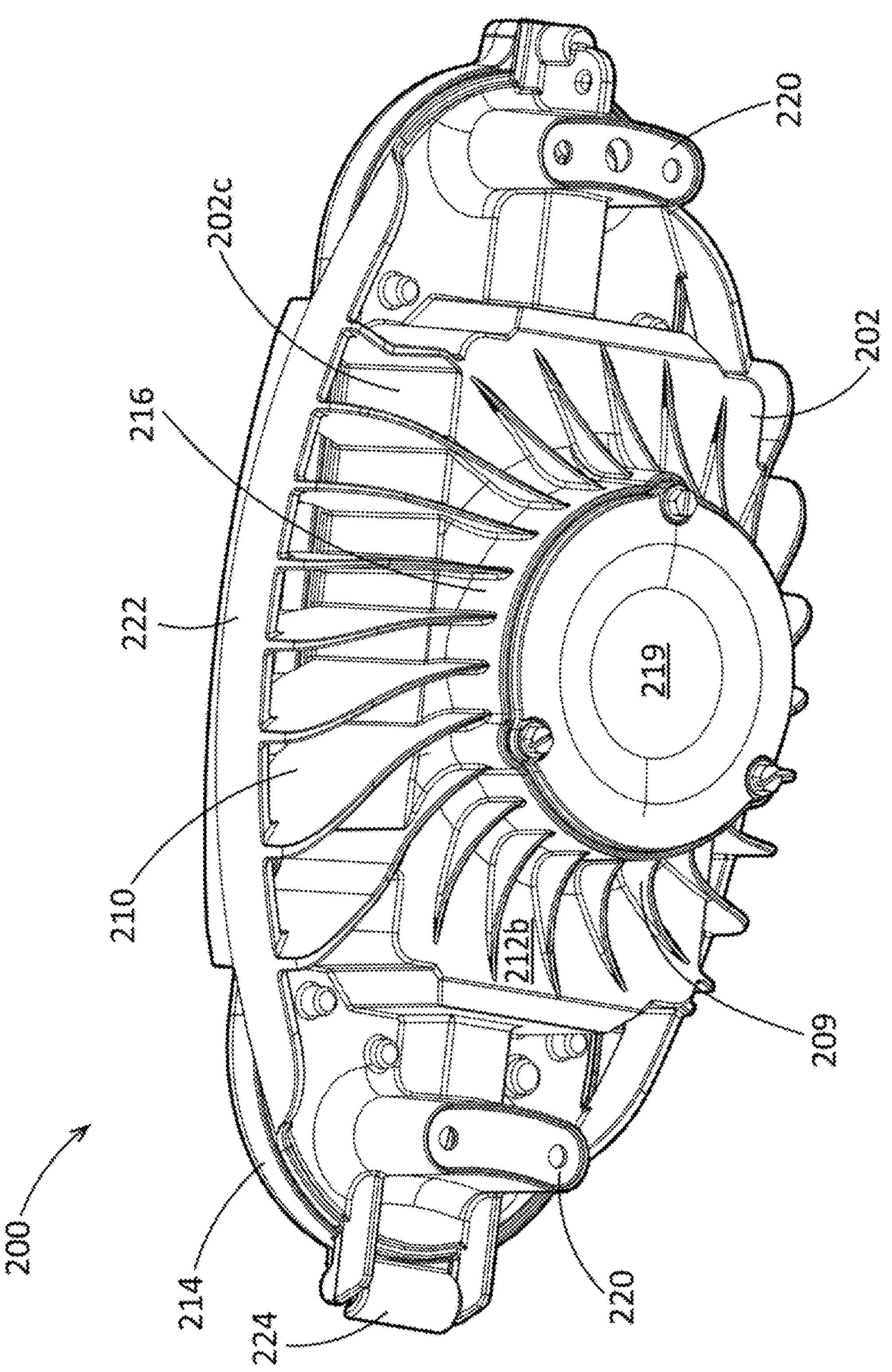
FIG. 10 illustrates a bottom perspective view of the electronics housing assembly of FIG. 9.
Figure 11:
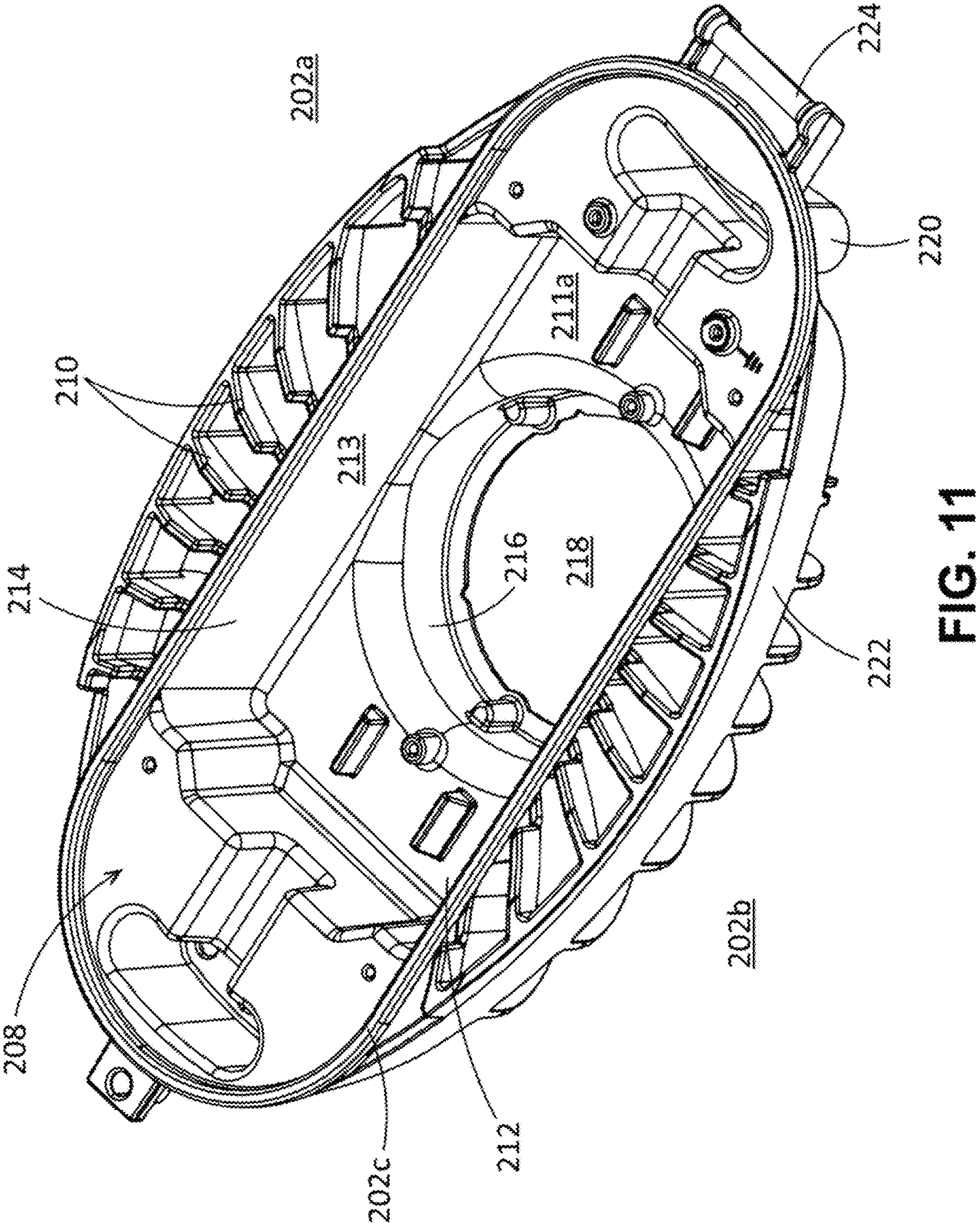
FIG. 11 illustrates a top perspective view of the electronics housing of the electronics housing assembly of FIGS. 8-10 in isolation.
Figure 12:
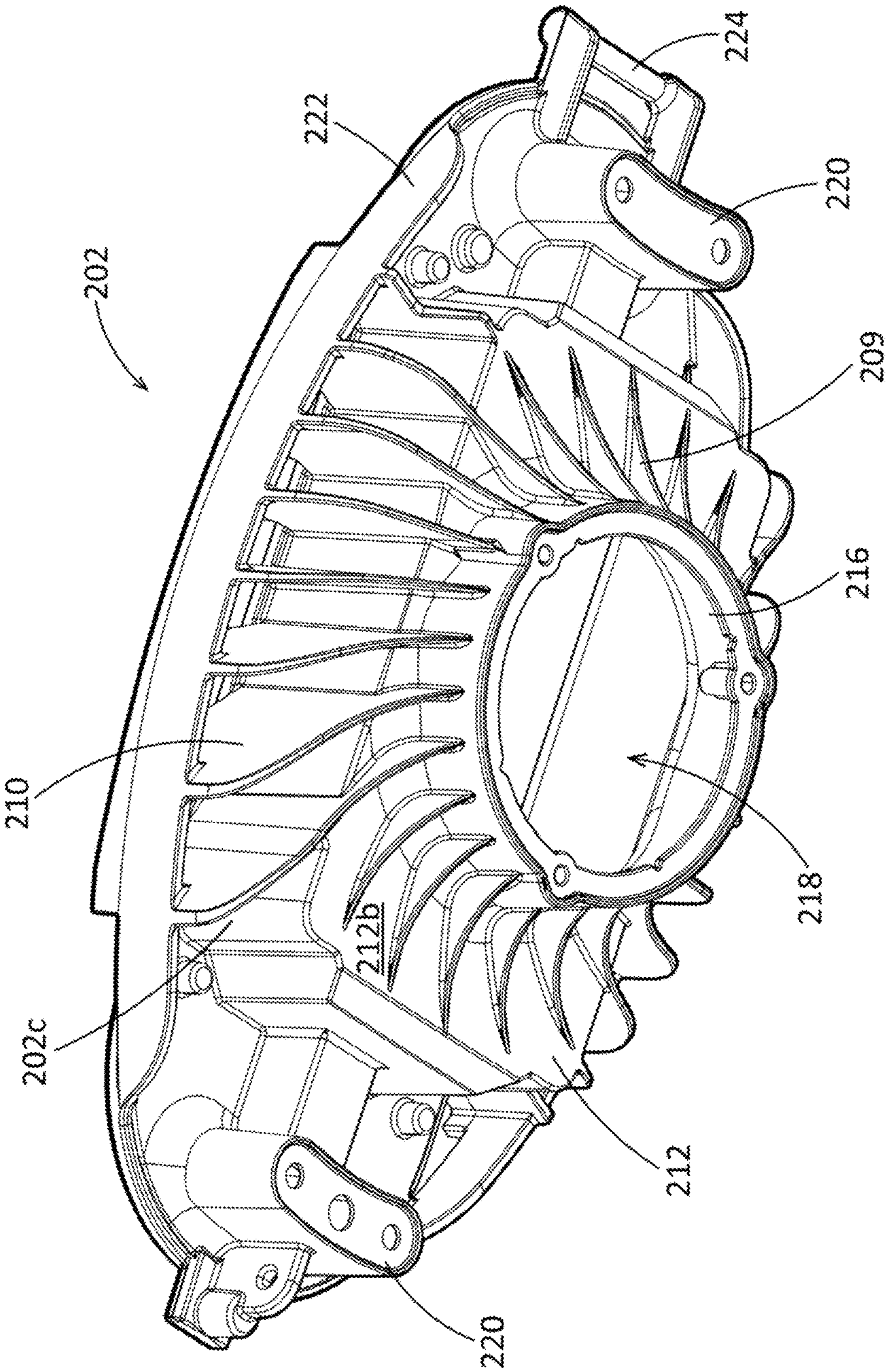
FIG. 12 illustrates a bottom perspective view of the electronics housing of FIG. 11.
Figure 13:
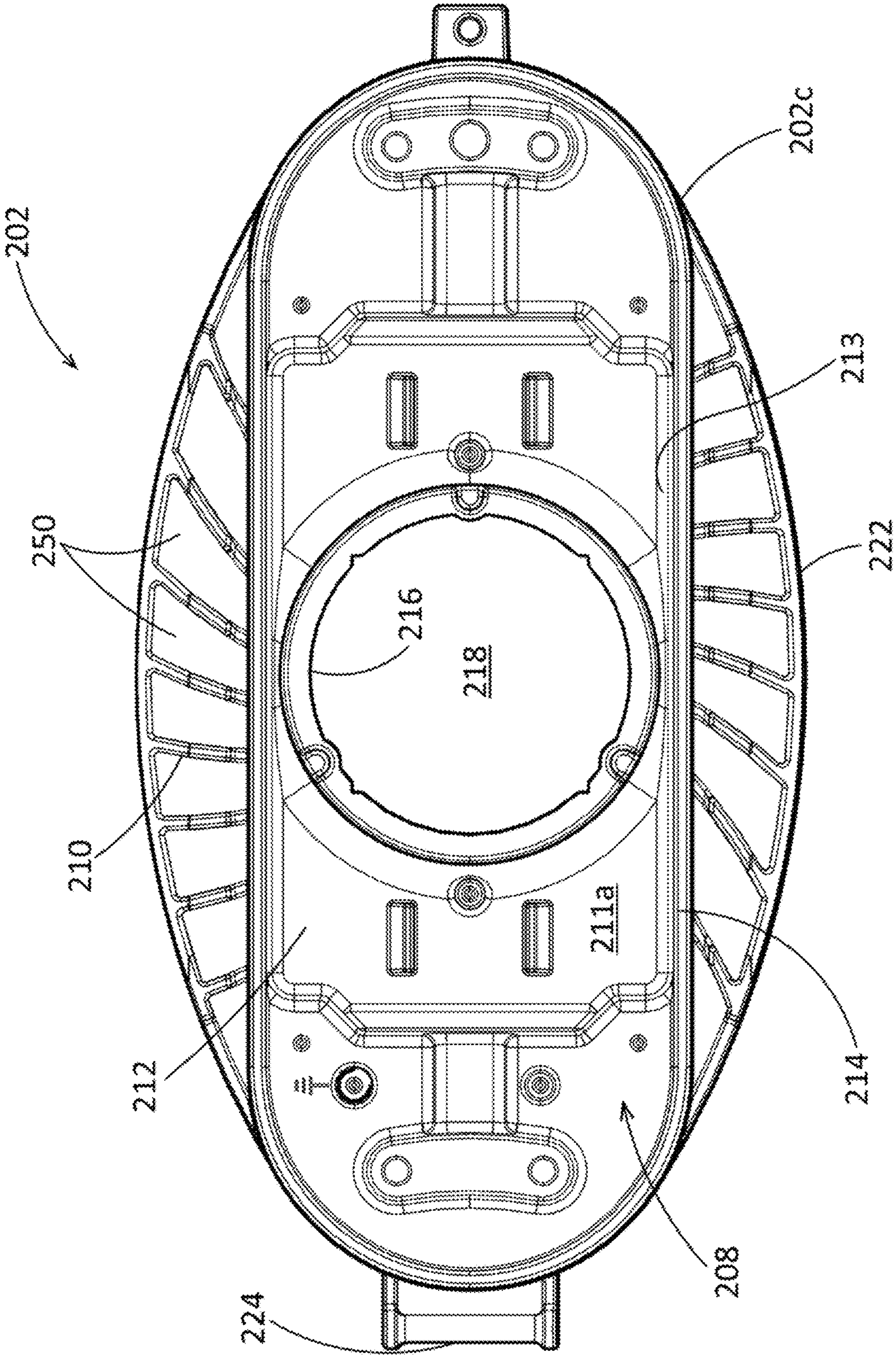
FIG. 13 illustrates a top plan view of the electronics housing of FIG. 11.
Figure 14:
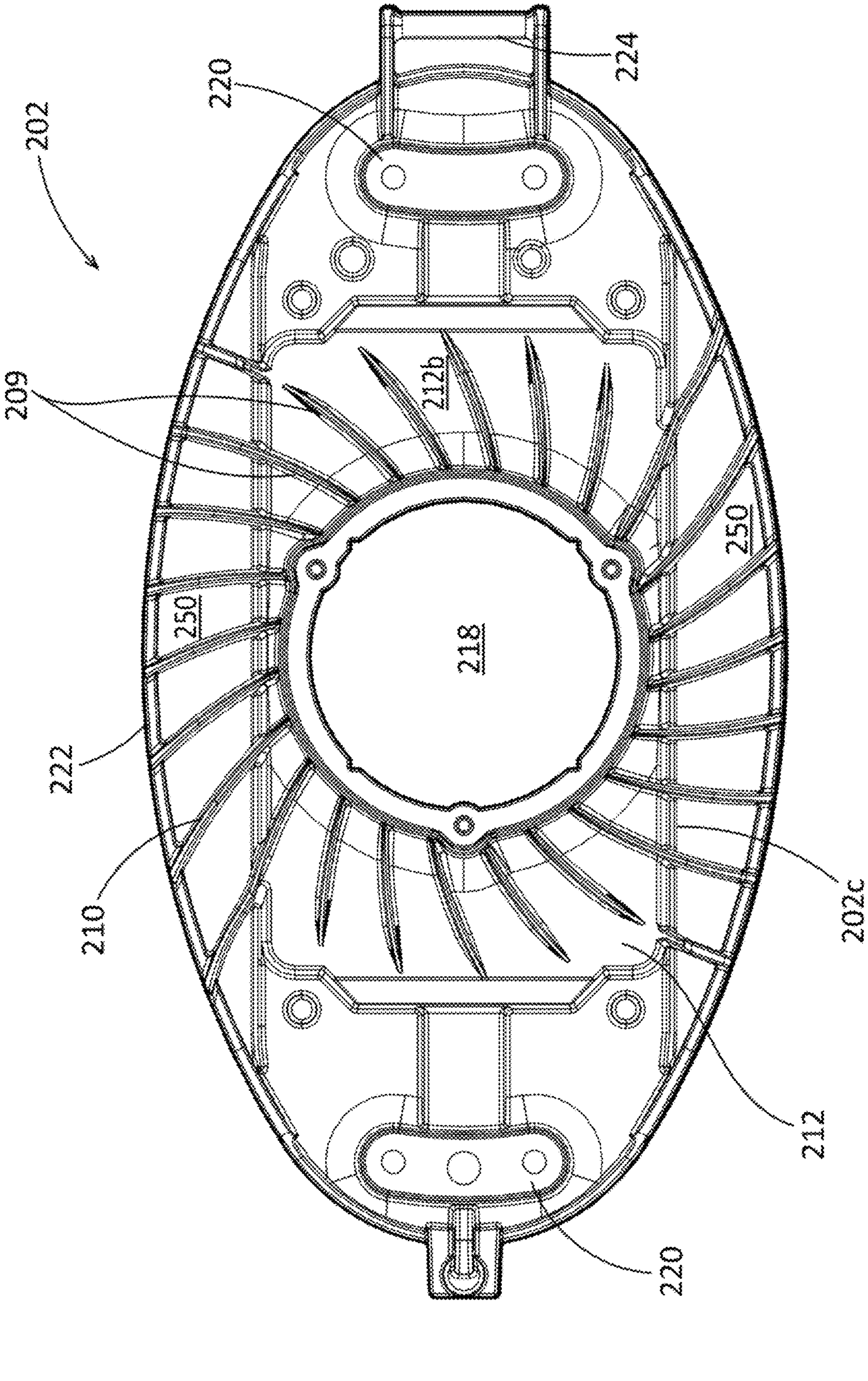
FIG. 14 illustrates a bottom plan view of the electronics housing of FIG. 11.
Figure 15:
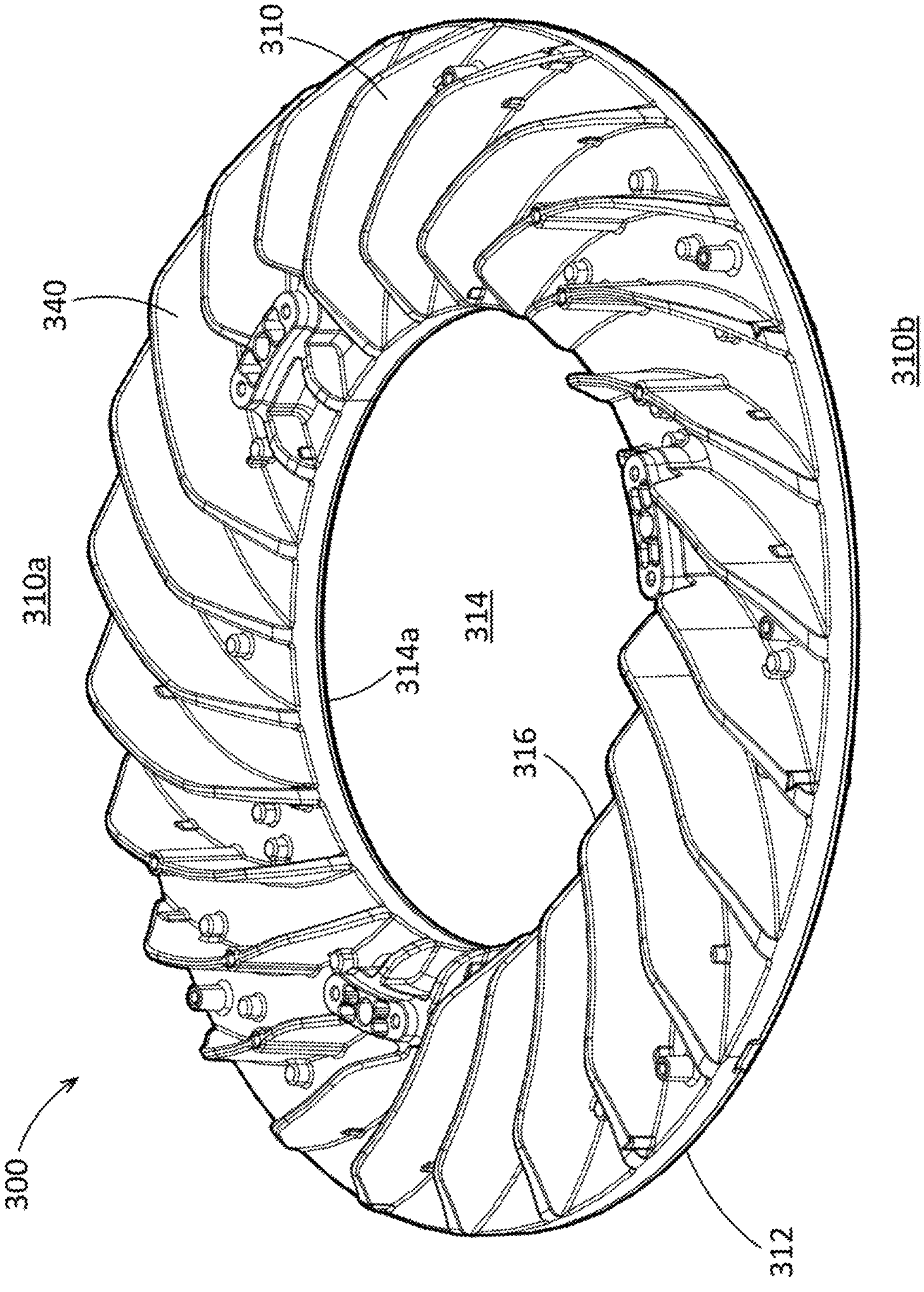
FIG. 15 illustrates a top perspective view of an embodiment of a lighting subassembly.
Figure 16:
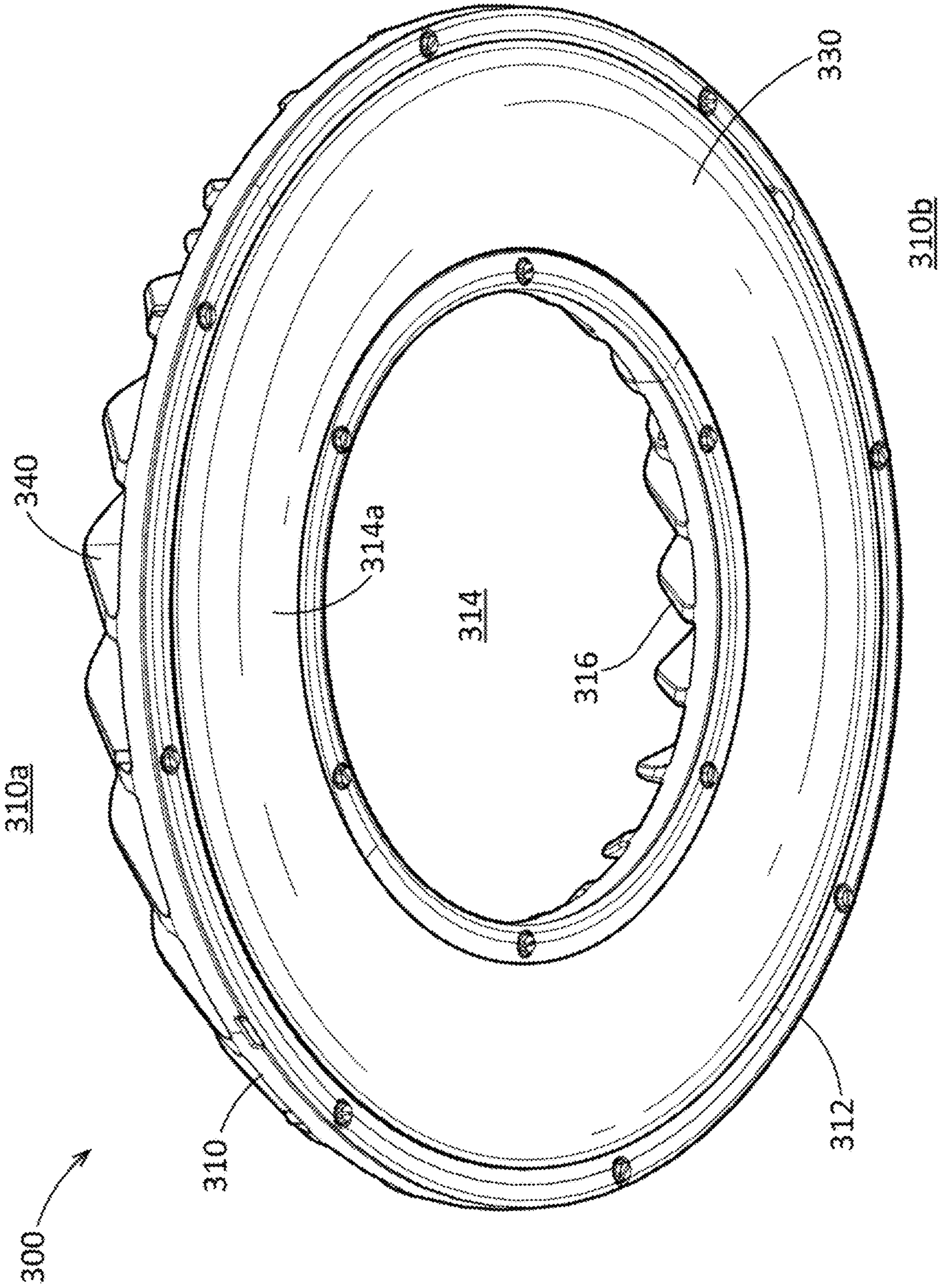
FIG. 16 illustrates a bottom perspective view of the lighting subassembly of FIG. 15.
Figure 17:
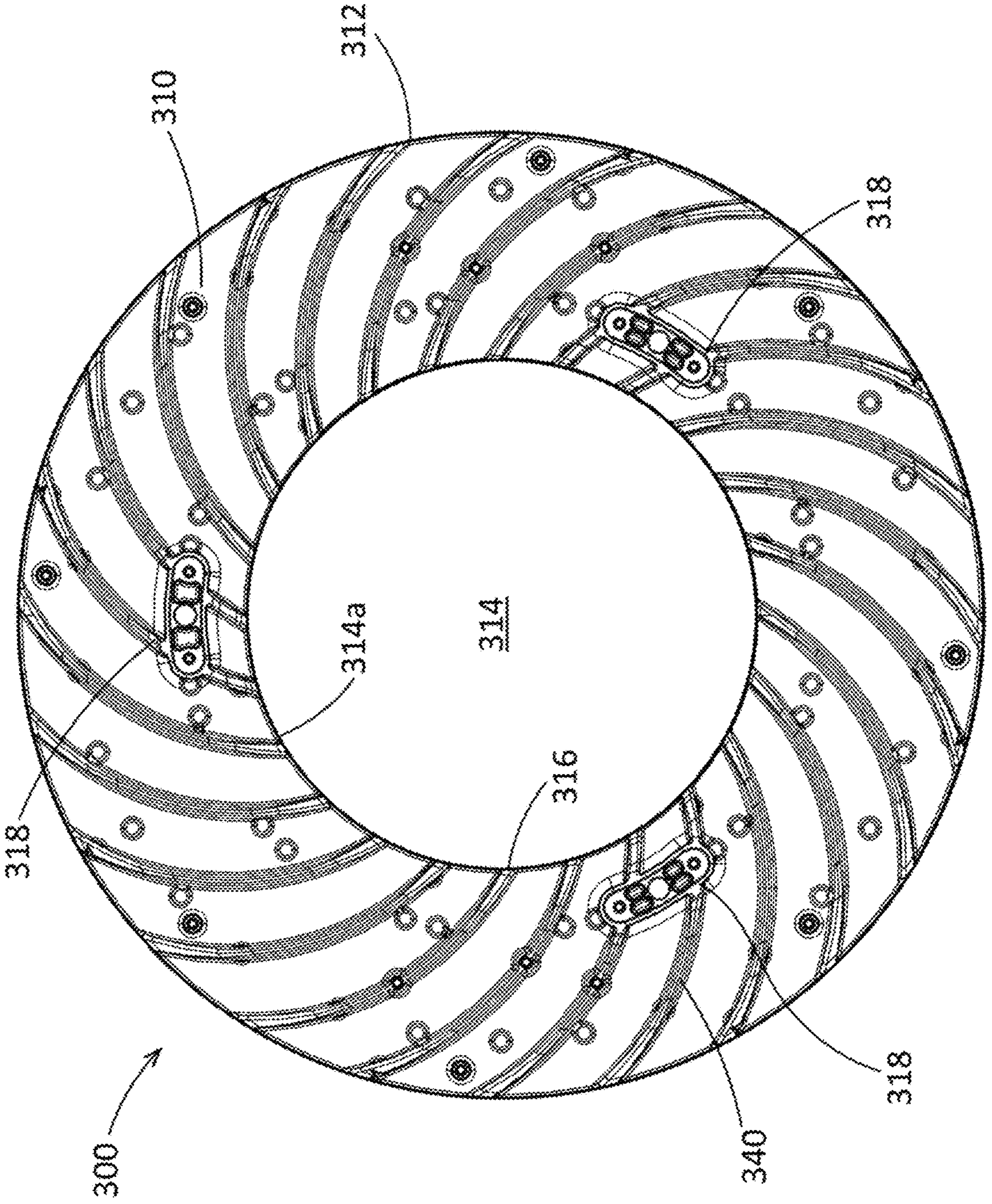
FIG. 17 illustrates a top plan view of the lighting subassembly of FIG. 15.
Figure 18:
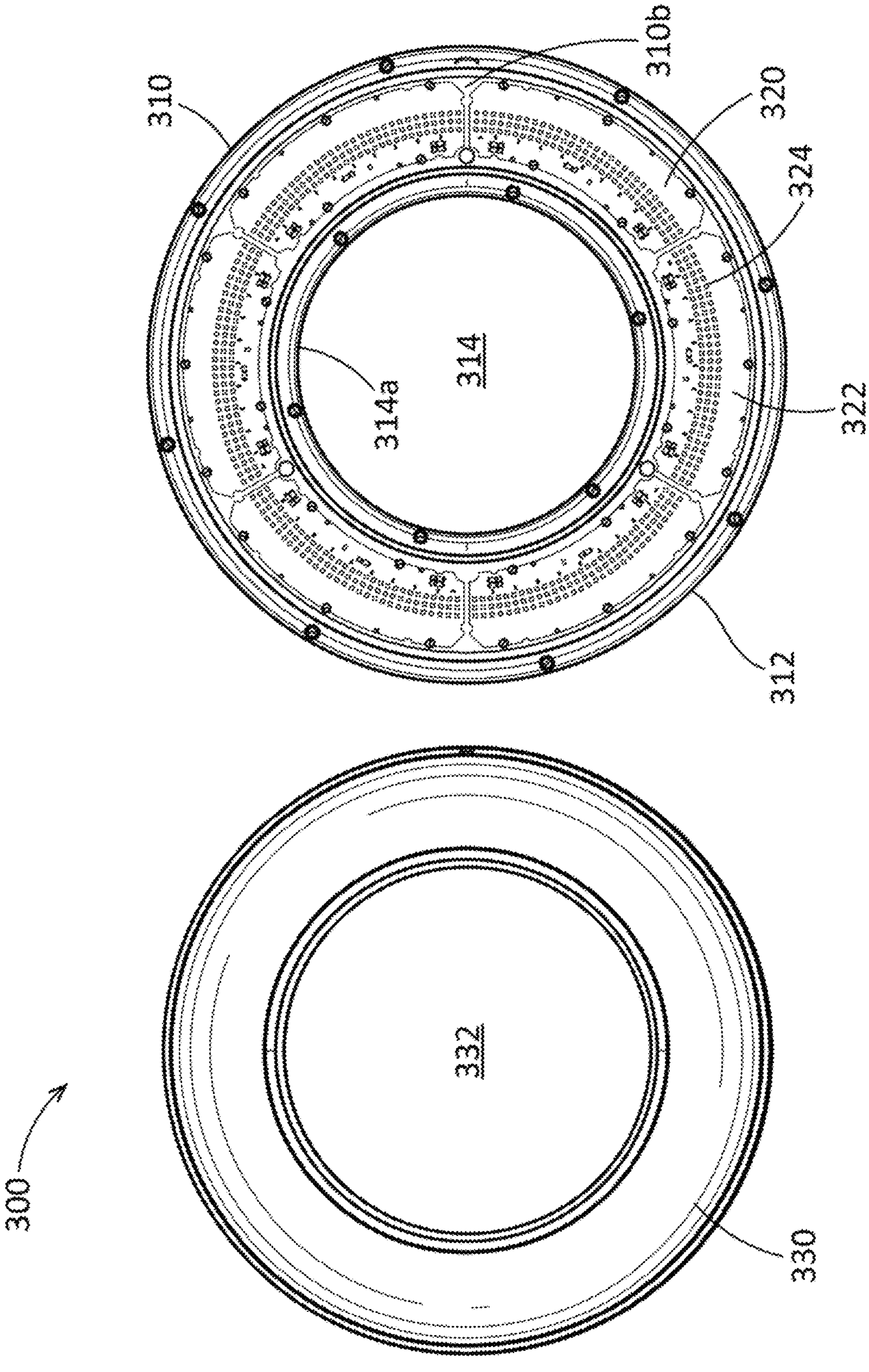
FIG. 18 illustrates a bottom plan view of the lighting subassembly of FIG. 15 with the optic exploded.
Figure 19:
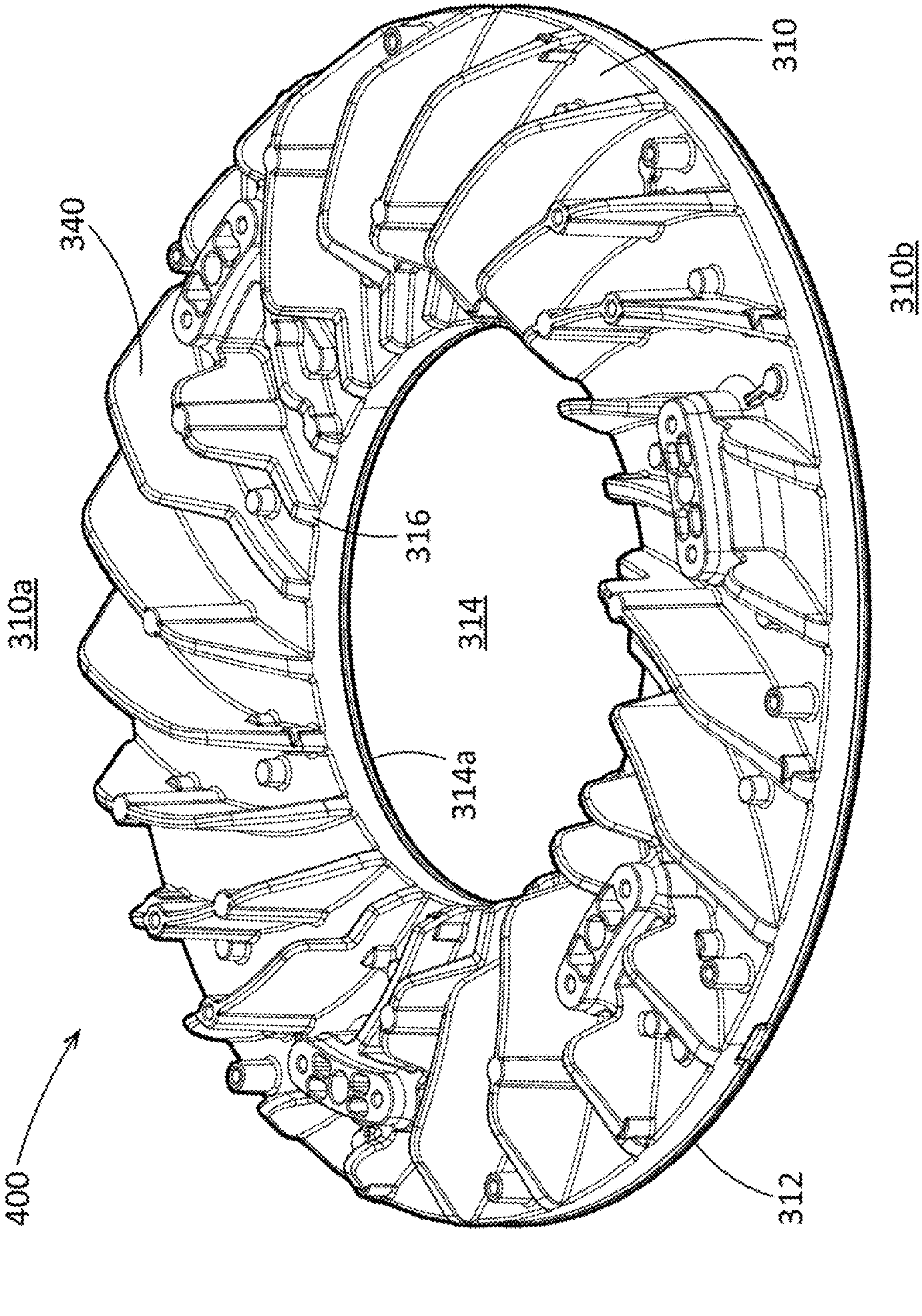
FIG. 19 illustrates a top perspective view of another embodiment of a lighting subassembly.
Figure 20:
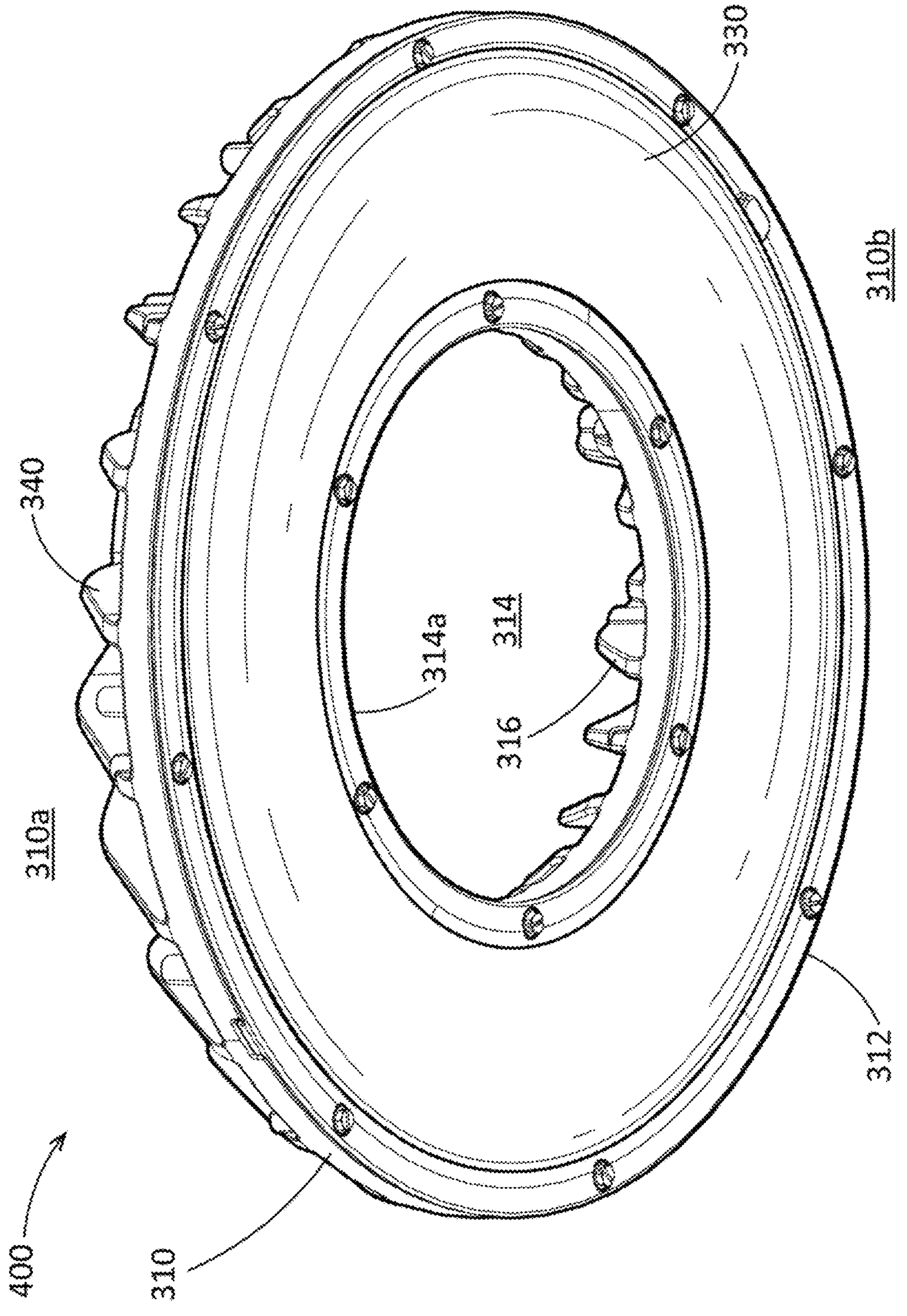
FIG. 20 illustrates a bottom perspective view of the lighting subassembly of FIG. 19.
Figure 21:
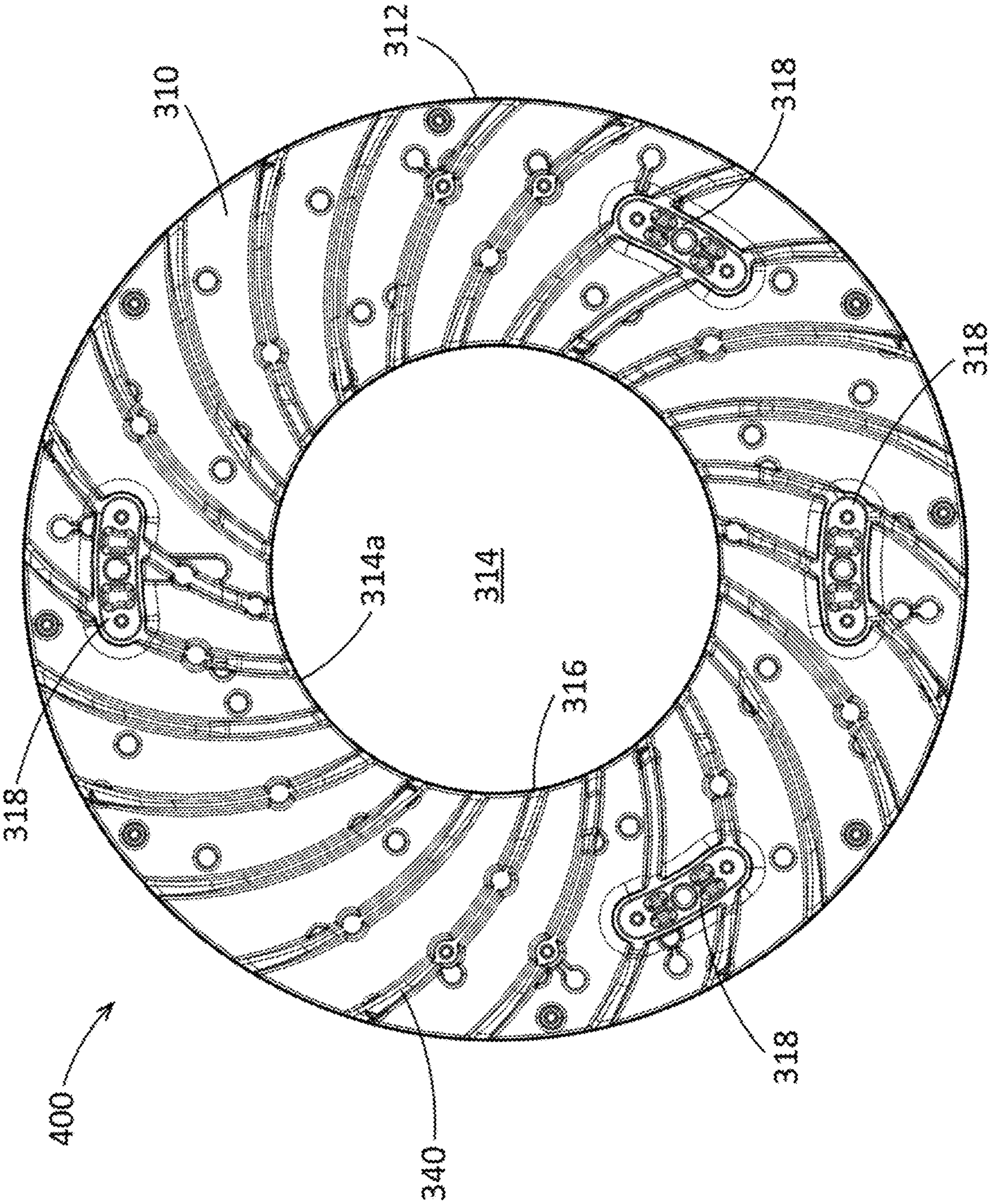
FIG. 21 illustrates a top plan view of the lighting subassembly of FIG. 19.
Figure 22:
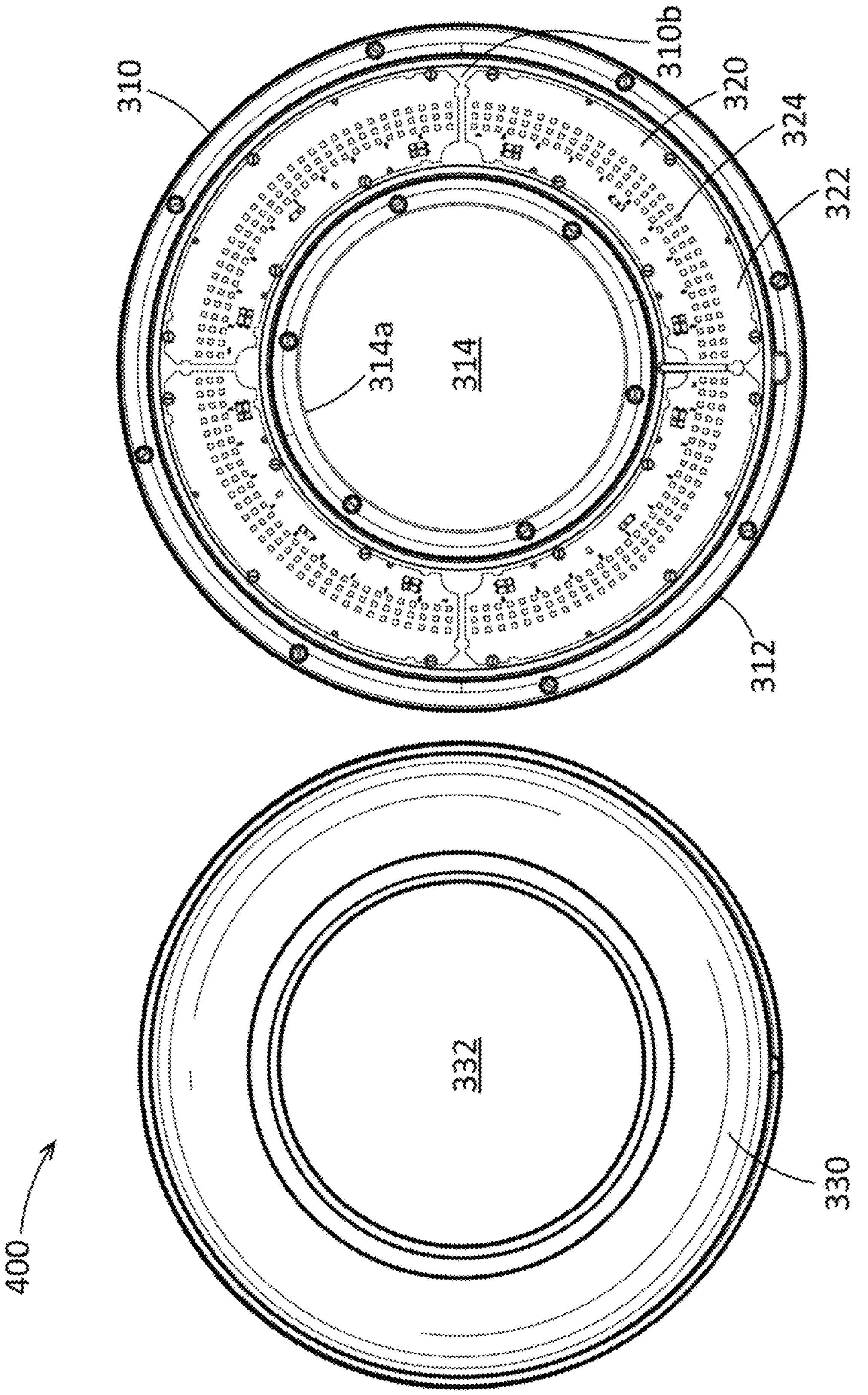
FIG. 22 illustrates a bottom plan view of the lighting subassembly of FIG. 19 with the optic exploded.

The subject matter of features of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention are directed to electronics housing assemblies that house drivers and other electronics for powering/controlling light sources within a light fixture. While such assemblies are described herein as housing drivers, it should understand that they could house other types of electronics and that their design would be beneficial for use with any heat-generating electronics. Regardless of the electronics they contain, the electronics assemblies are designed to improve heat dissipation both from the electronics assembly as well as from light fixtures with which such assemblies are used.

FIGS. 1-7 illustrate one embodiment of an electronics housing assembly 100 that generally includes an electronics housing 102, a top cover 104, and electronics (e.g., drivers 106) positioned within the electronics housing 102. In use, the electronics housing assembly 100 is mounted to a light fixture and the light sources in the light fixture are electrically connected to the electronics housed in the electronics housing assembly 100.

The electronics housing assembly 100 may be formed of suitable thermally conductive material so as to help dissipate the heat generated by the drivers 106. For example, in some embodiments, the electronics housing assembly 100 is formed from metal (such as aluminum or steel) to promote heat dissipation from the drivers 106 and may be formed integrally by casting.

The electronics housing 102 (shown in isolation in FIGS. 4-7) has an upper side 102*a* and a lower side 102*b* and generally includes a central driver compartment 108 in which the drivers 106 are positioned and perimeter heat sink fins 110 that radiate outwardly from the perimeter 102*c* of the central driver compartment 108. The central driver compartment 108 is shaped to receive one or more drivers 106, as shown in FIG. 1. In the embodiment of FIGS. 1-7, the central driver compartment 108 has a triangular shape defined by one or more base walls 112 and three sidewalls 114 oriented in the shape of a triangle. However, the central driver compartment 108 and/or the orientation of the sidewalls 114 can be of any shape that promotes direct contact between the surfaces of the drivers 106 and the central driver compartment 108 and that permits distancing of the drivers 106 from each other within the central driver compartment 108.

In some embodiments (see, e.g, FIG. 4), the base wall 112 includes a plurality of base wall portions 112*a*-112*c*, where adjacent base wall portions 112*a*-112*c* are at least partially laterally separated from each other by a gap 180 that impedes heat transfer between adjacent base wall portions 112*a*-112*c*. However, in other embodiments the base wall 112 is a continuous surface upon which multiple drivers 106 are mounted.

Three LED drivers 106 (although fewer could be used) are positioned within the central driver compartment 108 in a triangular orientation such that each is in contact with an inner surface 111*a* of the base wall 112 (and more specifically one of the base wall portions 112*a*-112*c*) and an inner surface 113 of one of the three sidewalls 114. In this way, at least two surfaces of each driver 106 are in contact with the electronics housing 102. However, embodiments of the invention provide for fewer or more surfaces of each driver 106 to be in thermal contact with the electronics housing 102.

In use, one or more surfaces of a driver 106 typically becomes hotter than other surfaces of the driver 106. In some embodiments, it may be beneficial to position the hottest surface(s) of the driver 106 in direct contact with the base wall 112 and/or sidewall 114 of the central driver compartment 108. In this way, a direct thermal path is created between the hottest portions of the driver 106 and the electronics housing 102. Moreover, each of the drivers 106 is physically isolated from the other drivers 106 (i.e., is spaced a distance from the other drivers 106 such that they do not touch) such that no direct heat path exists between adjacent drivers 106.

In some embodiments, a column 116 defining a column cavity 118 extends downwardly from the base wall(s) 112. Other fixture electronics 117 (e.g., controls, sensors, etc.) may be housed within the column cavity 118 of the column 116. In some embodiments, the column 116 is formed integrally with the base wall(s) 112. In such embodiments, for example, the base wall(s) 112 may extend downwardly so as to define the column cavity 118. In other embodiments, the column 116 may be formed separately and attached to the base wall(s) 112. In some embodiments, the column cavity 118 is in communication with the central driver compartment 108. A bottom cover 119 may be secured to the electronics housing 102 to enclose the column cavity 118, as shown at least in FIG. 3.

Housing mounting bosses 120 are provided for mounting the electronics housing assembly 100 to a light fixture, as discussed in more detail below. The housing mounting bosses 120 extend downwardly from the electronics housing 102 and preferably have a height that ensures that the electronics housing assembly 100 stands proud of a lighting subassembly when assembled such that air flow upwardly through the lighting subassembly is not impeded. Any number of housing mounting bosses 120 of any geometry may be used. Moreover, the number and location of the housing mounting bosses 120 may be provided such that the electronics housing assembly 100 may be mounted on lighting subassemblies that are structurally different (e.g., different shapes, sizes, etc.).

Perimeter heat sink fins 110 extend laterally outwardly from the central driver compartment 108 (such as from one or more sidewalls 114 or otherwise from the perimeter 102*c*). In some embodiments, base heat sink fins 109 may also be provided along the outer surface 111*b* of the base wall 112 (and column 116). In some embodiments, the base heat sink fins 109 appear to laterally align with the perimeter heat sink fins 110 (i.e., a distal end of a base heat sink fin 109 aligns with a proximal end of a perimeter heat sink fin 110) when the electronics housing 102 is viewed from the lower side 102*b* toward the upper side 102*a* such that fins 109, 110 collectively appear as a single heat sink fin in plan view (see, e.g., FIG. 7). In some embodiments, the perimeter heat sink fins 110 extend perpendicularly outwardly from the central driver compartment 108 (e.g., from one or more sidewalls 114 or otherwise from the perimeter 102*c*) but in other embodiments the perimeter heat sink fins 110 extend at different angles. In some embodiments, the fins 109, 110 may be straight while in other embodiments the fins 109, 110 are curved. Curved fins may be preferred in some embodiments as they increase the fin surface area available for thermal dissipation, but curved fins are not required. Fins of any shape or size may be used and provided in any density. Moreover, the shape, size, and densities of the fins may vary on an electronics housing 102.

Air passageways 250 may be formed between adjacent perimeter heat sink fins 110 that create flow paths for air to move upwardly through and past the electronics housing assembly 100, carrying away heat generated by the LEDs and drivers 106. In some embodiments at least one connecting wall 122 connects at least some adjacent perimeter heat sink fins 110 such that the air passageways 250 are bound by the adjacent perimeter heat sink fins 110, the connecting wall 122, and the central driver compartment 108. In some embodiments, the connecting wall(s) 122 connects the distal ends or tips of adjacent perimeter heat sink fins 110. In some embodiments, the connecting wall(s) 122 extends as a continuous wall spaced by the perimeter heat sink fins 110 a distance from the central driver compartment 108. In some embodiments, the connecting wall(s) 122 are curved. Connecting wall(s) 122 increases the available surface area for heat dissipation and also helps to create a stack effect that directs and facilitates upward movement of the cooler air through the air passageways 250 formed between adjacent fins 110.

In some embodiments, a top cover 104 is attached to the electronics housing 102 and can be used to enclose the central driver compartment 108. In some embodiments, the top cover 104 is of a size and shape that matches the footprint (i.e., perimeter 102*c*) of the central driver compartment 108 such that the top cover 104 seats over the central driver compartment 108 (in the illustrated embodiment, over the sidewalls 114) to enclose the central driver compartment 108. A gasket (not shown) may be interposed between the top cover 104 and central driver compartment 108 to seal the central driver compartment 108 against moisture, debris, and other contaminants that can detrimentally impact the drivers 106. In the illustrated embodiment, other fixture electronics 117 are mounted to the top cover 104. The top cover 104 may be provided with apertures 126 that permit heated air within the central driver compartment 108 to rise upwardly and through the apertures 126 in the top cover 104.

In some embodiments, the top cover 104 is movable relative to the electronics housing 102 to gain access to the central driver compartment 108. In some embodiments, the top cover 104 is entirely removable from the electronics housing 102. In other embodiments, the top cover 104 is pivotably attached to the electronics housing 102 so that it can be rotated downwardly to enclose the central driver compartment 108 and upwardly to expose the central driver compartment 108. In the illustrated embodiment, the top cover 104 is attached to the electronics housing 102 with a hinge 124 such that the top cover 104 is pivotable from an open position (see FIG. 1) to a closed position (see FIG. 2) and vice versa. The top cover 104 may be secured in the closed position using any fastening mechanism known in the art including screws, latches, etc. In the illustrated embodiment, apertured tabs 128 extend from the top cover 104 and receive fasteners (not shown) to secure the top cover 104 to the electronics housing 102.

FIGS. 8-14 illustrate another embodiment of an electronics housing assembly (electronics housing assembly 200). Electronics housing assembly 200 includes an electronics housing 202, a top cover 204, and electronics (e.g., drivers 206) positioned within the electronics housing 202. In use, the electronics housing assembly 200 is mounted to a light fixture and the light sources in the light fixture are electrically connected to the electronics housed in the electronics housing assembly 200.

The electronics housing assembly 200 may be formed of suitable thermally conductive material to help dissipate the heat generated by the drivers 206. For example, in some embodiments, the electronics housing assembly 200 is formed from metal (such as aluminum or steel) to promote heat dissipation from the drivers 206 and may be formed integrally by casting.

The electronics housing 202 (shown in isolation in FIGS. 11-14) has an upper side 202*a* and a lower side 202*b* and generally includes a central driver compartment 208 in which the drivers 206 are positioned and heat sink fins 210 that radiate outwardly from the perimeter 202*c* of the central driver compartment 208. The central driver compartment 208 is shaped to receive one or more drivers 206. In the embodiment of FIGS. 8-14, the central driver compartment 208 has one or more base walls 212 and at least two opposing sidewalls 214 (four sidewalls 214 are illustrated in FIGS. 8-14). In use, two drivers 206 (although few or more could be used) are mounted (such as via mounting brackets 50) parallel to each other and in contact with the inner surface 211*a* of the base wall 212 and the inner surface 213 one of the sidewalls 214. In this way, at least two surfaces of each driver 206 are in contact with the electronics housing 202. However, embodiments of the invention provide for fewer or more surfaces of each driver 206 to be in thermal contact with the electronics housing 202.

As discussed above, it may be beneficial to mount the drivers 206 so that their hottest surface(s) is in direct contact with a sidewall 214. The central driver compartment 208 and/or orientation of the sidewalls 214 may be of any shape that promotes direct contact between surfaces of the driver 206 and the central driver compartment 208 and permits distancing of the drivers 206 from each other within the central driver compartment 208. Moreover, by attaching the drivers 206 to opposing sidewalls 214, the drivers 206 are physically isolated such that no direct heat path exists between the drivers 206.

In some embodiments, a column 216 defining a column cavity 218 extends downwardly from the base wall(s) 212. Other fixture electronics 217 (e.g., controls, sensors, etc.) may be housed within the column cavity 218 of the column 216. In some embodiments, the column 216 is formed integrally with the base wall(s) 212. In such embodiments, for example, the base wall(s) 212 may extend downwardly so as to define the column cavity 218. In other embodiments, the column 216 may be formed separately and attached to the base wall(s) 212. In some embodiments, the column cavity 218 is in communication with the central driver compartment 208. A bottom cover 219 may be secured to the electronics housing 202 to enclose the column cavity 218, as shown at least in FIG. 10.

Housing mounting bosses 220 are provided for mounting the electronics housing assembly 200 to a light fixture, as discussed in more detail below. The housing mounting bosses 220 extend downwardly from the electronics housing 202 and preferably have a height that ensures that the electronics housing assembly 200 stands proud of a lighting subassembly when assembled such that air flow upwardly through the lighting subassembly is not impeded. Any number of housing mounting bosses 220 of any geometry may be used. Moreover, the number and location of the housing mounting bosses 220 may be provided such that the electronics housing assembly 200 may be mounted on lighting subassemblies that are structurally different (e.g., different shapes, sizes, etc.).

Perimeter heat sink fins 210 extend laterally outwardly from the central driver compartment 208 (such as from one or more sidewalls 214 or otherwise from perimeter 202*c*). In some embodiments, base heat sink fins 209 may also be provided along the outer surface 212*b* of the base wall 212 (and column 216). In some embodiments, the base heat sink fins 209 appear to laterally align with the perimeter heat sink fins 210 (i.e., a distal end of a base heat sink fin 209 aligns with a proximal end of a perimeter heat sink fin 210) when the electronics housing 202 is viewed from the lower side 202*b* toward the upper side 202*a* such that fins 109, 110 collectively appear as a single heat sink fin in plan view (see, e.g., FIG. 14). In some embodiments, the perimeter heat sink fins 210 extend perpendicularly outwardly from the central driver compartment 208 (e.g., from one or more sidewalls 214 or otherwise from perimeter 202*c*) but in other embodiments the perimeter heat sink fins 210 extend at different angles. In some embodiments, the fins 209, 210 may be straight while in other embodiments the fins 209, 210 are curved. Curved fins may be preferred in some embodiments as they increase the fin surface area available for thermal dissipation, but curved fins are not required. Fins of any shape or size may be used and provided in any density. Moreover, the shape, size, and densities of the fins may vary on an electronics housing 202.

Air passageways 250 may be formed between adjacent perimeter heat sink fins 210 that create flow paths for air to move upwardly through and past the electronics housing assembly 200, carrying away heat generated by the LEDs and drivers 206. In some embodiments at least one connecting wall 222 connects at least some adjacent perimeter heat sink fins 210 such that the air passageways 250 are bound by the adjacent perimeter heat sink fins 210, the connecting wall(s) 222, and the central driver compartment 208. In some embodiments, the connecting wall(s) 222 connects the distal ends or tips of adjacent perimeter heat sink fins 210. In some embodiments, the connecting wall(s) 222 extends as a continuous wall spaced by the perimeter heat sink fins 210 a distance from the central driver compartment 208. In some embodiments, the connecting wall(s) 222 are curved. Connecting wall(s) 222 increases the available surface area for heat dissipation and also helps to funnel the cooler air upwardly through the air passageways 250 formed between adjacent heat sink fins 210, as explained above.

In some embodiments, a top cover 204 is attached to the electronics housing 202 and can be used to enclose the central driver compartment 208. In some embodiments, the top cover 204 is of a size and shape that matches the footprint (i.e., perimeter 202*c*) of the central driver compartment 208 such that the top cover 204 seats over the central driver compartment 208 to enclose the central driver compartment 208. A gasket (not shown) may be interposed between the top cover 204 and central driver compartment 208 to seal the central driver compartment 208 against moisture, debris, and other contaminants that can detrimentally impact the drivers 206. In the illustrated embodiment, other fixture electronics 217 are mounted to the top cover 204. The top cover 204 may be provided with apertures 226 that permit heated air within the central driver compartment 208 to rise upwardly and through the apertures 226 in the top cover 204.

In some embodiments, the top cover 204 is movable relative to the electronics housing 202 to gain access to the central driver compartment 208. In some embodiments, the top cover 204 is entirely removable from the electronics housing 202. In other embodiments, the top cover 204 is pivotably attached to the electronics housing 202 so that it can be rotated downwardly to enclose the central driver compartment 208 and upwardly to expose the central driver compartment 208. In the illustrated embodiment, the top cover 204 is attached to the electronics housing 202 with a hinge 224 such that the top cover 204 is pivotable from an open position (see FIG. 8) to a closed position (see FIG. 9) and vice versa. The top cover 204 may be secured in the closed position using any fastening mechanism known in the art including screws, latches, etc. In the illustrated embodiment, an apertured tab 228 extends from the top cover 204 and receives a fastener (not shown) to secure the top cover 204 to the electronics housing 202.

Figure 23:
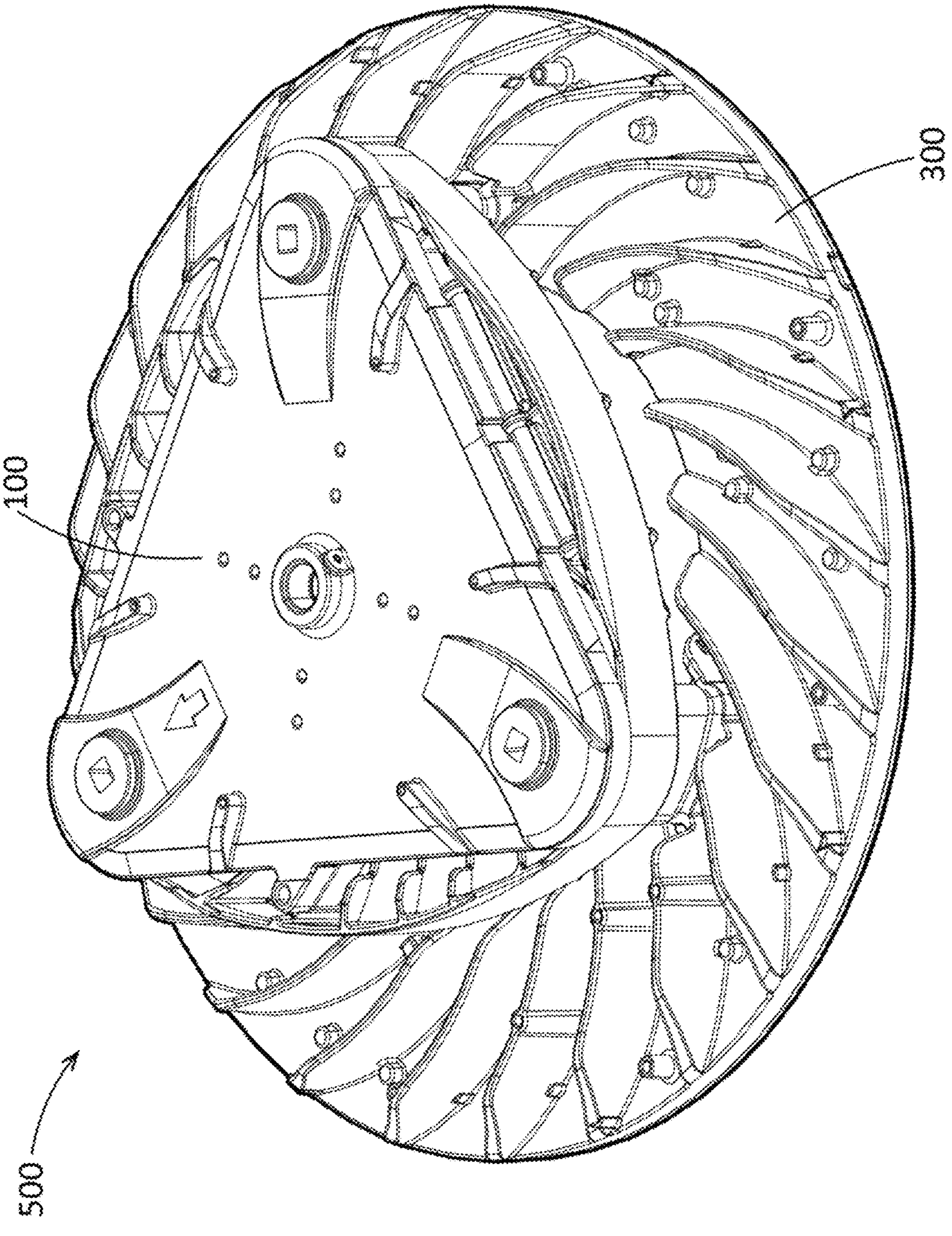
FIG. 23 illustrates a top perspective view of an embodiment of a light fixture with the electronics housing assembly of FIGS. 1-7 attached to the lighting subassembly of FIGS. 15-18.
Figure 24:
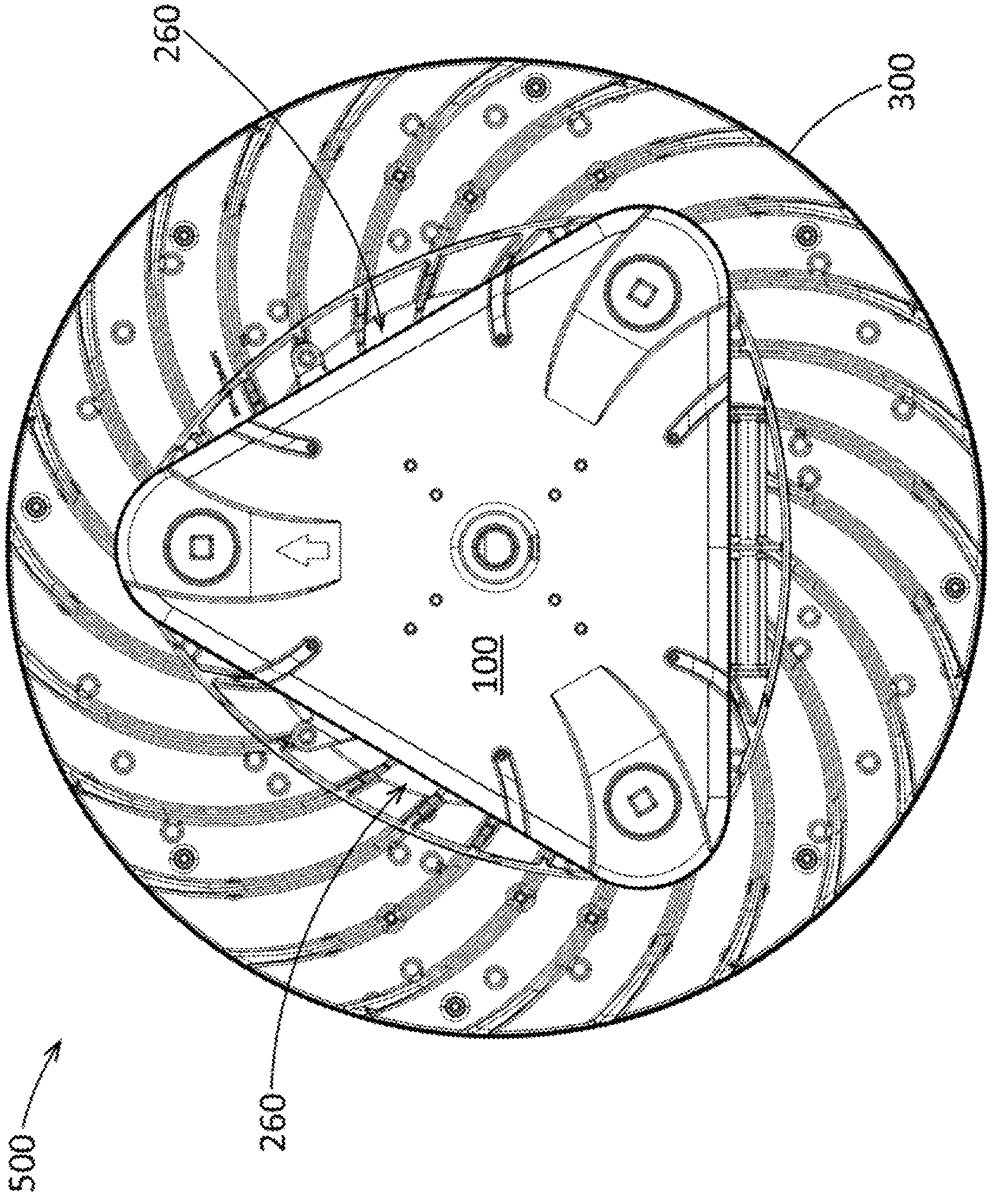
FIG. 24 illustrates a top plan view of the light fixture of FIG. 23.
Figure 25:
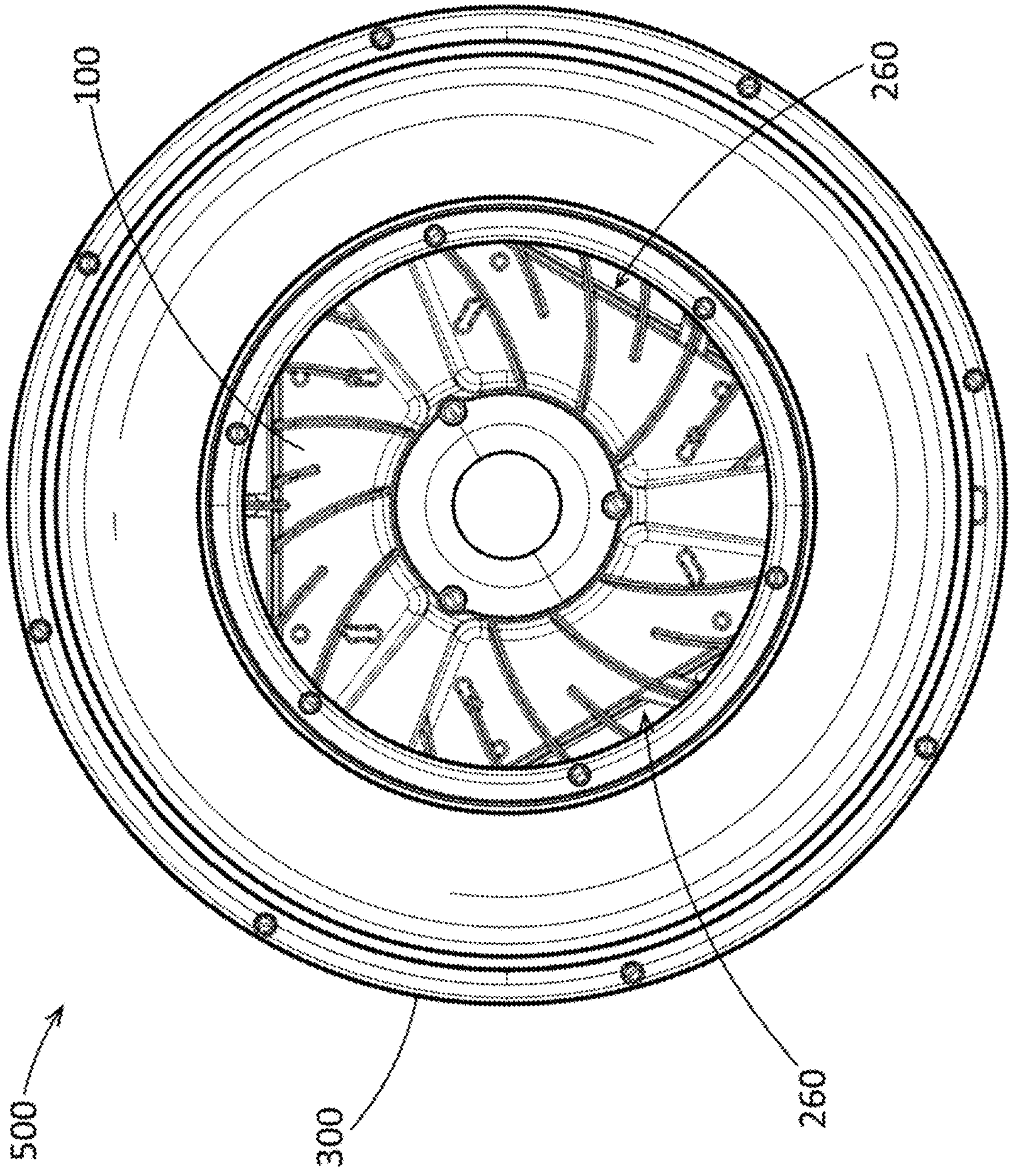
FIG. 25 illustrates a bottom plan view of the light fixture of FIG. 23.
Figure 26:
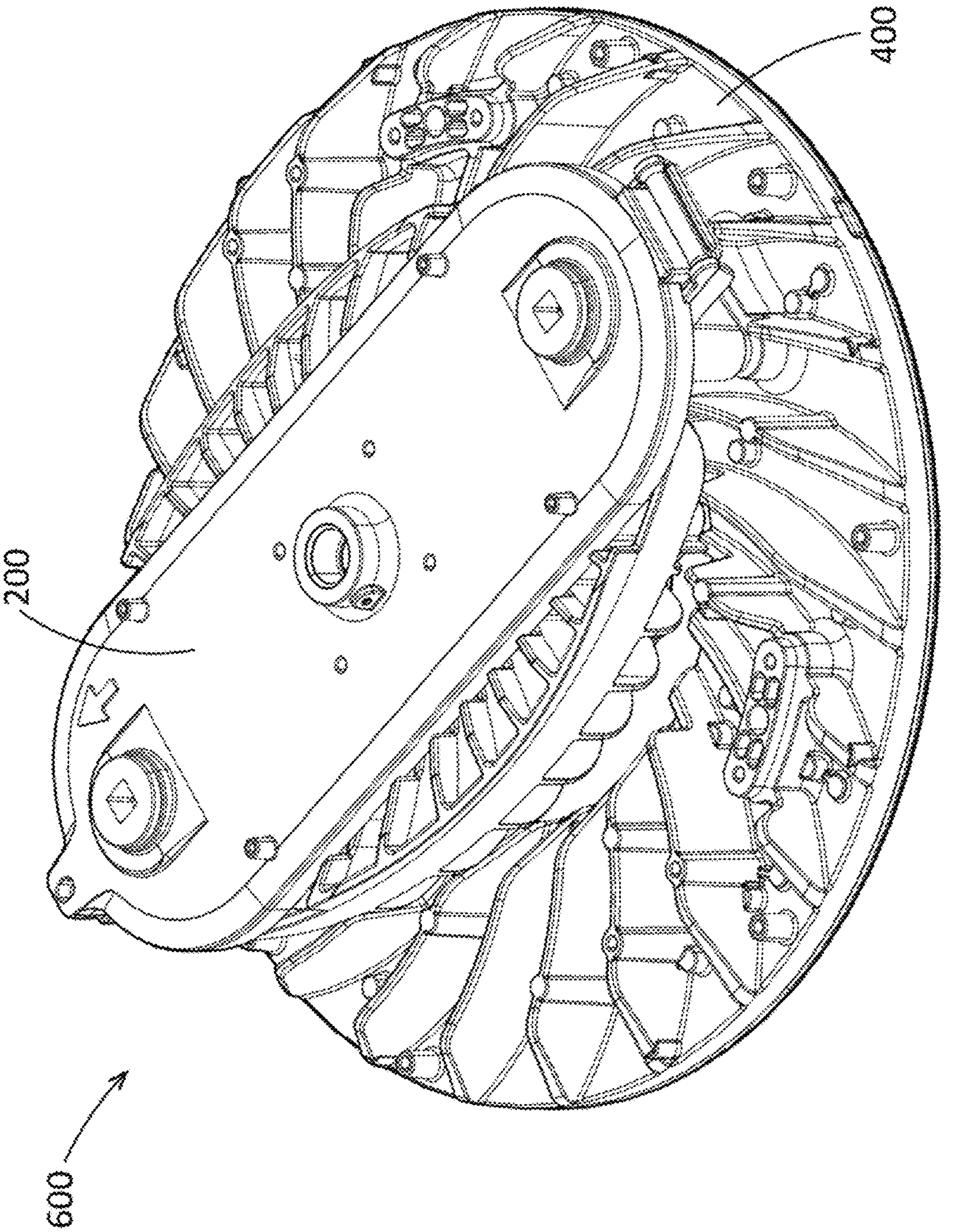
FIG. 26 illustrates a top perspective view of an embodiment of a light fixture with the electronics assembly of FIGS. 8-14 attached to the lighting subassembly of FIGS. 19-22.
Figure 27:
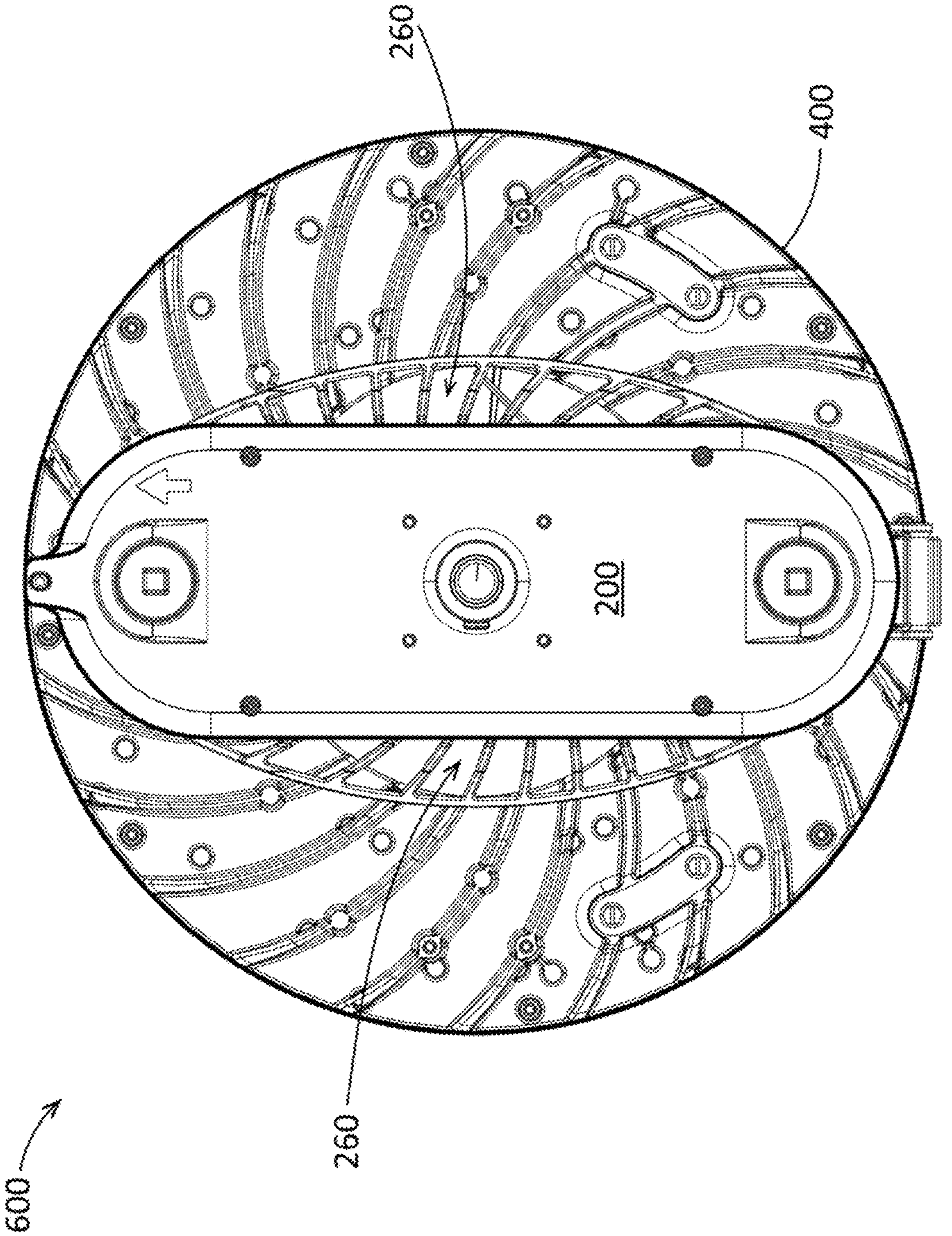
FIG. 27 illustrates a top plan view of the light fixture of FIG. 26.
Figure 28:
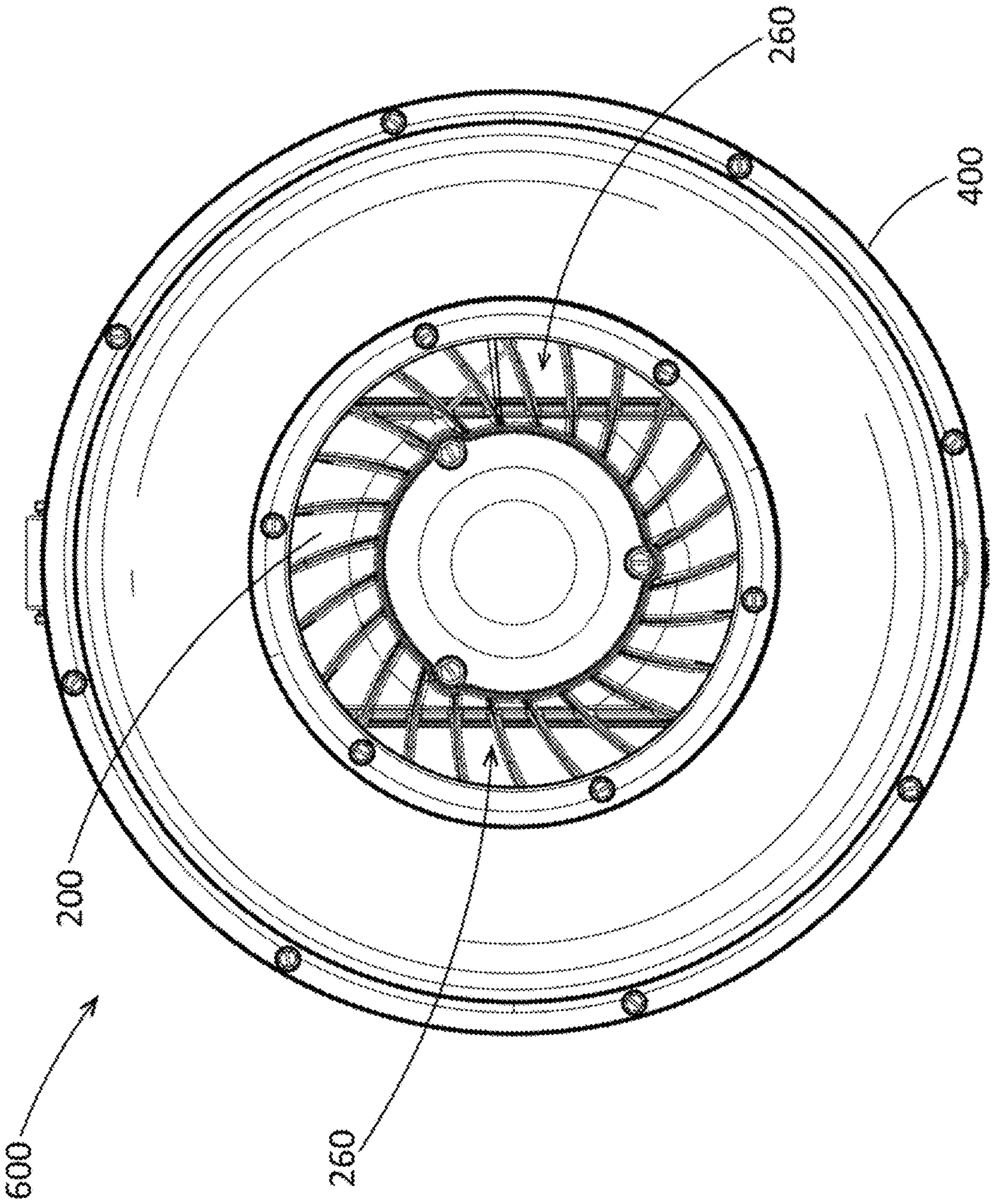
FIG. 28 illustrates a bottom plan view of the light fixture of FIG. 26.
Figure 29:
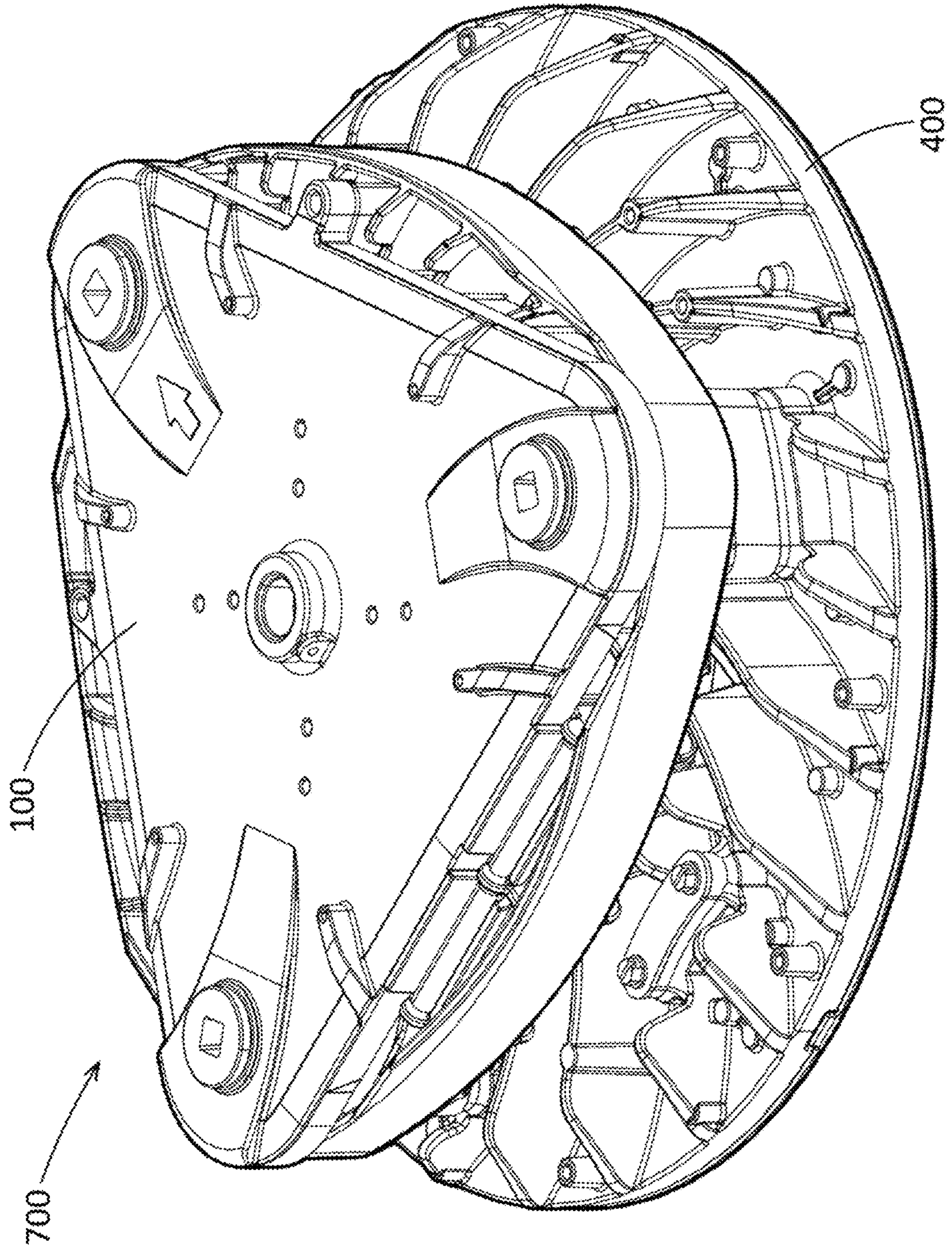
FIG. 29 illustrates a top perspective view of an embodiment of a light fixture with the electronics housing assembly of FIGS. 1-7 attached to the lighting subassembly of FIGS. 19-22.
Figure 30:
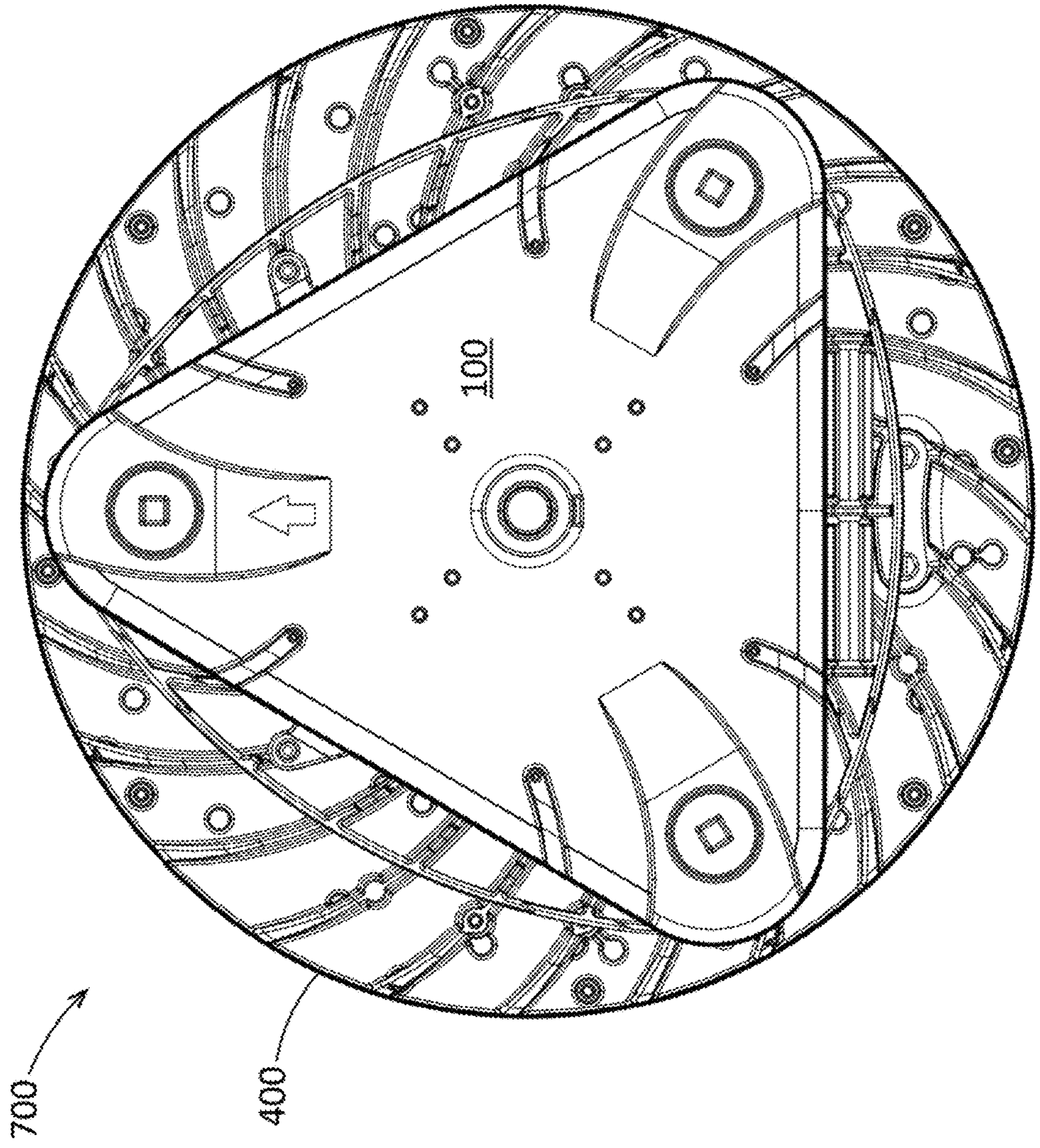
FIG. 30 illustrates a top plan view of the light fixture of FIG. 29.
Figure 31:
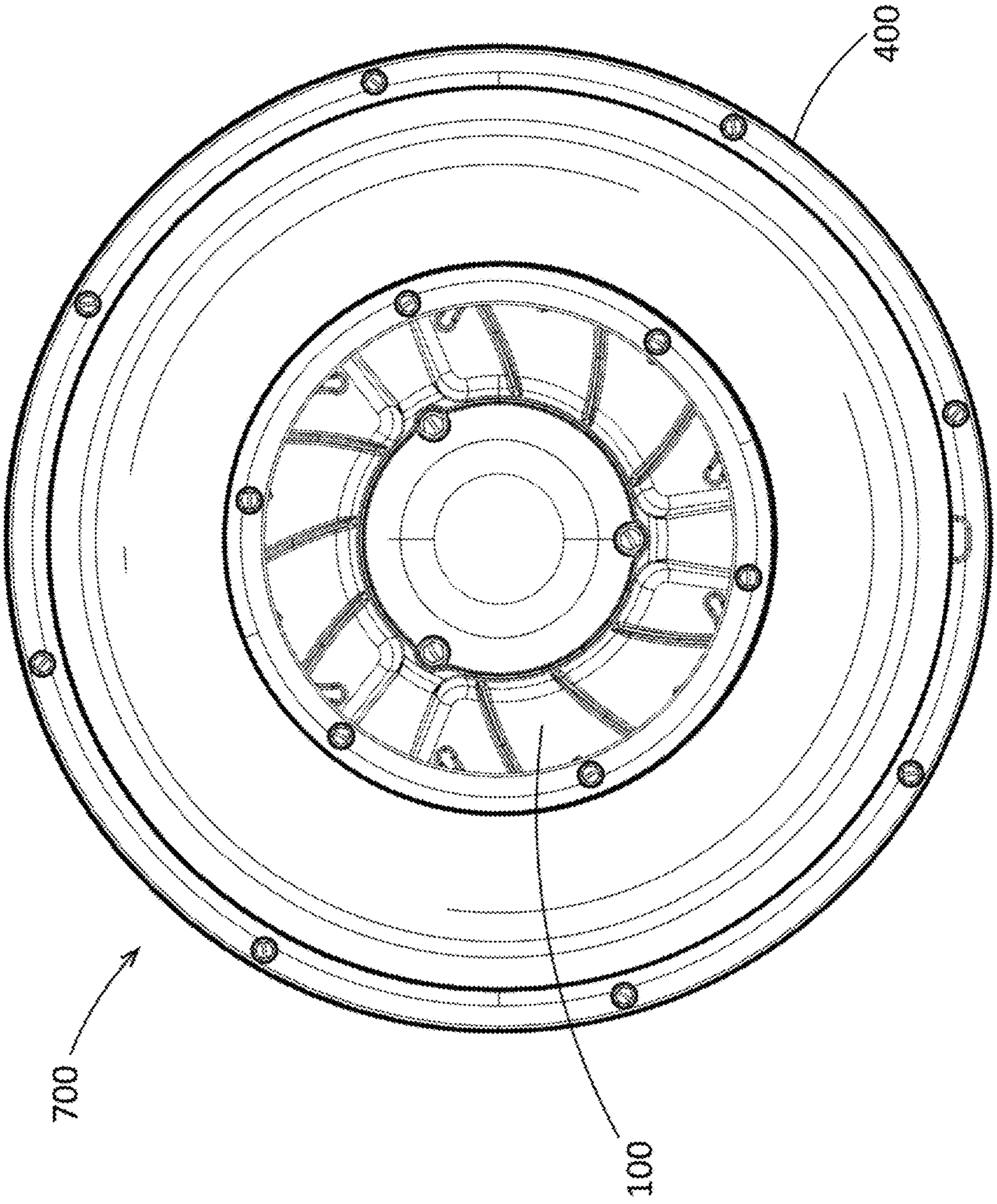
FIG. 31 illustrates a bottom plan view of the light fixture of FIG. 29.

Electronics assemblies 100, 200 may be attached to a lighting subassembly to form a light fixture. FIGS. 15-18 illustrate an embodiment of lighting subassembly 300, and FIGS. 19-22 illustrate an embodiment of lighting subassembly 400. FIGS. 23-25 illustrate electronics housing assembly 100 attached to lighting subassembly 300 to form light fixture 500, FIGS. 26-28 illustrate electronics housing assembly 200 attached to lighting subassembly 400 to form light fixture 600, and FIG. 29-31 illustrates electronics housing assembly 100 attached to lighting subassembly 400 to form light fixture 700.

FIGS. 15-22 illustrate embodiments of lighting subassemblies 300, 400 that may be used with electronic assemblies 100, 200. More specifically, electronic assemblies 100, 200 are mounted on the upper side of a lighting subassembly 300, 400. However, electronic assemblies 100, 200 may be used with lighting subassemblies other than those illustrated in the figures.

While minor differences may exist, the general structures of the lighting subassemblies 300, 400 are the same and thus they are described together. The lighting subassembly 300, 400 generally includes a chassis body 310, at least one LED lighting module 320 mounted to the chassis body 310, and an optional optic 330 provided over the LED lighting module(s) 320.

As shown in the figures, the chassis body 310 has a chassis upper side 310*a*, a chassis lower side 310*b*, a chassis outer perimeter edge 312, and a central aperture 314 defined by an aperture edge 314*a* that defines a crosswise aperture dimension (e.g., diameter) and an aperture area. In the illustrated embodiment, the chassis body 310 has a semi-toroidal shaped (e.g., donut-shaped) configuration. It will be recognized, however, that other shapes and configurations for the chassis body 310 may be used. Purely by way of example, the chassis body 310 may have an oval, square, rectangular, or triangular shape and include a central aperture 314 of the same or different shape towards the center of the chassis through which air can pass upwardly through the chassis body 310. The chassis body 310 may be integrally formed from any material having suitable rigidity, structural integrity, and thermal management (i.e., heat conduction and dissipation) properties. In some embodiments, the chassis body 310 is formed from metal (such as aluminum or steel) and may be formed integrally by casting.

At least one LED lighting module 320 is mounted to the lower side 310*b* of the chassis body 310. The LED lighting module(s) 320 may include a printed circuit board 322 populated with a plurality of LEDs 324. In some embodiments, the at least one LED lighting module 320 includes a single LED lighting module. In other embodiments, the at least one LED lighting module 320 includes two or more LED lighting modules 320. As shown in the non-limiting embodiments of FIGS. 15-22, one or more arc-shaped LED lighting modules 320 are arranged in a circular configuration on the chassis body 310 around the central aperture 314.

An optic 330 having a central aperture 332 that may align with the central aperture 314 of the chassis body 310 may be positioned over the LED lighting module(s) 320. One or more gaskets (not shown) may be positioned between the chassis body 310 and optic 330 to seal the LED lighting module(s) 320 within the optic 330 and thereby protect it from moisture, debris, and other undesirable environmental conditions and/or contaminants.

The chassis body 310 acts as a heat sink in the lighting subassembly 300, 400 to dissipate heat from the lighting subassembly 300, 400. A plurality of chassis fins 340 may be provided on the exposed upper side 310*a* of the chassis body 310 opposite the LED lighting module(s) 320 to increase the available surface area for dissipation of heat generated by the LED lighting module(s) 320. By way only of example, a plurality of chassis fins 340 may radiate outwardly along the upper side 310*a* of the chassis body 310. Any number of chassis fins 340 may be utilized, depending on desired aesthetic and performance characteristics.

As shown in the figures, the chassis fins 340 extend at least partially between the aperture edge 314*a* and the chassis outer perimeter edge 312. In some embodiments the chassis fins 340 are straight and extend in a straight line between the aperture edge 314*a* and the chassis outer perimeter edge 312. In other embodiments, the chassis fins 340 are curved along the upper side 310*a* of the chassis body 310, with proximal ends 316 converging towards the central aperture 314. Any shape, orientation, and number of chassis fins 340 may be provided.

Chassis mounting bosses 318 are provided on the exposed upper surface of the chassis body 310. During light fixture assembly, the housing mounting bosses 120, 220 and the chassis mounting bosses 318 are aligned and screws or other fastening mechanisms are positioned through apertures provided in the housing mounting bosses 120, 220 and the chassis mounting bosses 318 to removably couple the lighting subassembly 300, 400 to an electronics housing assembly 100, 200. The number and location of the chassis mounting bosses 318 may be customized depending on which electronics housing assembly 100, 200 it is intended to couple or the number and location of the chassis mounting bosses 318 may be provided such that the lighting subassembly 300, 400 may universally couple to different electronics housings.

One of skill in the art will understand that the scale of the lighting subassembly 300, 400 and electronics housing assembly 100, 200 can be adjusted depending on the desired lumen output and power supply needed to achieve it. Moreover, different lighting subassemblies and electronics housing assemblies may be mixed and matched depending on the lighting and power needs of a particular installation.

In some embodiments, the relative size of the central aperture 314 of the chassis body 310 and the electronics housing assembly 100, 200 is such that, when coupled to the lighting subassembly 300, 400, the electronics housing assembly 100, 200 covers or extends across the entirety of the area of the central aperture 314 when viewed from below. For example, in the light fixture 700 shown in FIGS. 30 and 31, electronics housing assembly 100 entirely covers the central aperture 314 of lighting subassembly 400. However, engagement of the housing mounting bosses 120 with the chassis mounting bosses 318 ensures that the electronics housing assembly 100 stands proud of the central aperture 314 of the chassis body 310 such that air can still flow upwardly through the central aperture 314 and circulate around the electronics housing assembly 100.

In other embodiments, the relative size of the central aperture 314 of the chassis body 310 and the electronics housing assembly 100, 200 is such that, when coupled to the lighting subassembly 300, 400, the electronics housing assembly 100, 200 covers or extends across only a portion of the area of the central aperture 314 (but not the entire area of the central aperture 314) when viewed from below (see, e.g., FIGS. 24, 25, 27, and 28). This creates air channels 260 that form a direct upward flow path for air through the central aperture 314 and perimeter heat sink fins 110, 210.

In some embodiments (see FIGS. 24, 27, and 30), the electronics housing assembly 100, 200 is secured relative to the lighting subassembly 300, 400 such that the fins 110, 210 of the electronics housing assembly 100, 200 rotationally align with the chassis fins 340 on the chassis body 310 such that fins 110, 210 appear to laterally align with chassis fins 340 when the light fixture 500, 600, 700 is viewed from above. In this way, fins 110, 210 and chassis fins 340 appear essentially as an extension of each other so as to create unobstructed upward air flow paths. However, such is not a requirement and the fins 110, 210 may be oriented rotationally offset from the fins 340 on the chassis body 310 such that they do not align when the light fixture 500, 600, 700 is viewed from above.

During operation of the light fixture 500, 600, 700, heat is generated by the at least one LED lighting module 320 and drivers 106, 206. The heat is conducted to the chassis body 310 and electronics housing 102, 202, causing the air around the light fixture 500, 600, 700 to be warmer than the air below the light fixture 500, 600, 700. The cooler air below the light fixture 500, 600, 700 is naturally drawn upwards towards the warmer air, passing upwardly around and through the lighting subassembly 300, 400 and upwardly around and through the electronics housing assembly 100, 200. More specifically, the cooler air moves upwardly through the central aperture 314 (and in some cases the air channels 260) and through the air passageways 250, removing heat via convection. The air flow paths formed through air passageways 250 facilitate cooling of the electronics housing assembly 100, 200 and its components by way of natural convection. Positioning the drivers 106, 206 such that the hottest surface(s) of the driver 106, 206 are in contact with, and directly conduct heat to, the electronics housing 102, 202 creates a more direct path for heat to conduct to the electronics housing assembly 100, 200 and thus results in more heat being available more quickly for removal from the electronics housing assembly 100, 200 by the cooler air.

The light fixture 500, 600, 700 may be configured to hang from a ceiling or other structure by any available means. In some embodiments, one end of a suspension apparatus, such as, but not limited to, a wire rope assembly may be attached to the light fixture. The other end of the suspension apparatus may be attached to the ceiling.

EXAMPLES

A collection of exemplary embodiments, including at least some explicitly enumerated as "Examples" providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1. An electronics housing assembly comprising an electronics housing having an upper side and a lower side and comprising: a central driver compartment having a compartment perimeter and comprising at least one base wall, a first sidewall, and a second sidewall, wherein the first sidewall and the second sidewall extend upwardly from the at least one base wall, and a plurality of perimeter heat sink fins extending outwardly from the central driver compartment, wherein adjacent perimeter heat sink fins define air passageways that extend between the upper side and the lower side of the electronics housing; a first driver positioned within the central driver compartment such that a first surface of the first driver is in contact with the at least one base wall and a second surface of the first driver is in contact with the first sidewall; a second driver positioned within the central driver compartment and physically isolated from the first driver, wherein a first surface of the second driver is in contact with the at least one base wall and a second surface of the second driver is in contact with the second sidewall; and a cover adapted to engage the electronics housing to enclose the central driver compartment.

Example 2. The electronics housing assembly of any of the preceding or subsequent examples or combination of examples, wherein the at least one base wall comprises a first base wall portion and a second base wall portion separated from the first base wall portion by a gap, wherein the first driver is in contact with the first base wall portion and wherein the second driver is in contact with the second base wall portion.

Example 3. The electronics housing assembly of any of the preceding or subsequent examples or combination of examples, wherein the central driver compartment further comprises a third sidewall and wherein the first sidewall, the second sidewall, and the third sidewall form a triangle.

Example 4. The electronics housing assembly of any of the preceding or subsequent examples or combination of examples, further comprising a third driver positioned within the central driver compartment and physically isolated from the first driver and from the second driver, wherein a first surface of the third driver is in contact with the at least one base wall and a second surface of the third driver is in contact with the third sidewall.

Example 5. The electronics housing assembly of any of the preceding or subsequent examples or combination of examples, wherein the first driver, the second driver, and the third driver are arranged in a triangular configuration within the central driver compartment.

Example 6. The electronics housing assembly of any of the preceding or subsequent examples or combination of examples, wherein the first sidewall, the second sidewall, and the third sidewall define the compartment perimeter and wherein the compartment perimeter is triangular.

Example 7. The electronics housing assembly of any of the preceding or subsequent examples or combination of examples, wherein the first sidewall and the second sidewall are located on opposing sides of the central driver compartment.

Example 8. The electronics housing assembly of any of the preceding or subsequent examples or combination of examples, wherein the electronics housing further comprises at least one connecting wall spaced outwardly a distance from the central driver compartment and that connects at least some adjacent perimeter heat sink fins such that at least some of the air passageways are bounded by the adjacent perimeter heat sink fins, the connecting wall, and the central driver compartment.

Example 9. The electronics housing assembly of any of the preceding or subsequent examples or combination of examples, wherein the central driver compartment further comprises a plurality of base heat sink fins extending outwardly toward the compartment perimeter along an outer surface of the base wall.

Example 10. The electronics housing assembly of any of the preceding or subsequent examples or combination of examples, wherein at least one base heat sink fin laterally aligns with one perimeter heat sink fin when the electronics housing is viewed from the upper side toward the lower side.

Example 11. The electronics housing assembly of any of the preceding or subsequent examples or combination of examples, wherein the central driver compartment further comprises a column defining a column cavity and extending downwardly from the base wall.

Example 12. The electronics housing assembly of any of the preceding or subsequent examples or combination of examples, wherein the cover is adapted to pivot relative to the electronics housing between an open position and a closed position.

Example 13. The electronics housing assembly of any of the preceding or subsequent examples or combination of examples, wherein the plurality of perimeter heat sink fins curves outwardly from the central driver compartment.

Example 14. The electronics housing assembly of any of the preceding or subsequent examples or combination of examples, wherein the electronics housing assembly is configured to couple to a first lighting subassembly to form a first light fixture.

Example 15. The electronics housing assembly of any of the preceding or subsequent examples or combination of examples, wherein the electronics housing assembly is configured to couple to a second lighting subassembly that is structurally different from the first lighting subassembly to form a second light fixture.

Example 16. A light fixture comprising a lighting subassembly comprising: a chassis body having an upper side, a lower side, a chassis outer perimeter edge, and a central aperture extending from the lower side to the upper side such that air may pass through the central aperture upwardly from the lower side to the upper side of the chassis body, wherein an aperture edge defines the central aperture and a central aperture area; and at least one LED module mounted on the lower side of the chassis body; and an electronics housing having an upper side and a lower side and comprising a central driver compartment having a compartment perimeter and comprising at least one base wall, a first sidewall, and a second sidewall, wherein the first sidewall and the second sidewall extend upwardly from the base wall; and a plurality of perimeter heat sink fins extending outwardly from the central driver compartment, wherein adjacent perimeter heat sink fins define air passageways between the upper side and the lower side of the electronics housing and wherein the air passageways are adapted to receive air passing upwardly through the central aperture of the chassis body; a first driver positioned within the central driver compartment such that a first surface of the first driver is in contact with the at least one base wall and a second surface of the first driver is in contact with the first sidewall; a second driver positioned within the central driver compartment and physically isolated from the first driver, wherein a first surface of the second driver is in contact with the at least one base wall and a second surface of the second driver is in contact with the second sidewall; and a cover adapted to engage the electronics housing to enclose the central driver compartment.

Example 17. The light fixture of any of the preceding or subsequent examples or combination of examples, wherein the chassis body further comprises a plurality of chassis heat sink fins provided along the upper side of the chassis body and extending at least partially between the aperture edge and the chassis outer perimeter edge.

Example 18. The light fixture of any of the preceding or subsequent examples or combination of examples, wherein at least one chassis heat sink fin laterally aligns with at least one perimeter heat sink fin when the light fixture is viewed from above.

Example 19. The light fixture of any of the preceding or subsequent examples or combination of examples, wherein the electronics housing extends over only a portion of the central aperture area when the light fixture is viewed from below.

Example 20. The light fixture of any of the preceding or subsequent examples or combination of examples, wherein the electronics housing extends over the entire central aperture area when the light fixture is viewed from below.

Example 21. The light fixture of any of the preceding or subsequent examples or combination of examples, wherein at least one of the chassis perimeter edge or the aperture edge defines a circle.

Example 22. An electronics housing assembly comprising an electronics housing having an upper side and a lower side and comprising a central driver compartment having a compartment perimeter and comprising at least one base wall, a first sidewall, a second sidewall adjacent the first sidewall, and a third sidewall adjacent the first sidewall and the second sidewall, wherein the first sidewall, the second sidewall, and the third sidewall extend upwardly from the at least one base wall and form a triangular shape; a plurality of perimeter heat sink fins extending outwardly from the central driver compartment, wherein adjacent perimeter heat sink fins define air passageways that extend between the upper side and the lower side of the electronics housing; and at least one connecting wall spaced outwardly a distance from the central driver compartment and that connects at least some adjacent perimeter heat sink fins such that at least some of the air passageways are bounded by the adjacent perimeter heat sink fins, the connecting wall, and the central driver compartment; a first driver positioned within the central driver compartment such that a first surface of the first driver is in contact with the at least one base wall and a second surface of the first driver is in contact with the first sidewall; a second driver positioned within the central driver compartment and physically isolated from the first driver, wherein a first surface of the second driver is in contact with the at least one base wall and a second surface of the second driver is in contact with the second sidewall; and a cover adapted to engage the electronics housing to enclose the central driver compartment.

Example 23. The electronics housing assembly of any of the preceding or subsequent examples or combination of examples, further comprising a third driver positioned within the central driver compartment and physically isolated from the first driver and from the second driver, wherein a first surface of the third driver is in contact with the at least one base wall and a second surface of the third driver is in contact with the third sidewall.

Different arrangements of the components depicted in the drawings or described above, as well as components and steps not shown or described are possible. Similarly, some features and subcombinations are useful and may be employed without reference to other features and subcombinations. Features of the invention have been described for illustrative and not restrictive purposes, and alternative features will become apparent to readers of this patent. Accordingly, the present invention is not limited to the features described above or depicted in the drawings, and various features and modifications can be made without departing from the scope of the claims below.

What is claimed is:

1. An electronics housing assembly comprising:
- a. an electronics housing having an upper side and a lower side and comprising:
  - i. a central driver compartment having a compartment perimeter and comprising at least one base wall, a first sidewall, and a second sidewall, wherein the first sidewall and the second sidewall extend upwardly from the at least one base wall; and
  - ii. a plurality of perimeter heat sink fins extending outwardly from the central driver compartment, wherein adjacent perimeter heat sink fins define air passageways that extend between the upper side and the lower side of the electronics housing;
- b. a first driver positioned within the central driver compartment such that a first surface of the first driver is in contact with the at least one base wall and a second surface of the first driver is in contact with the first sidewall;
- c. a second driver positioned within the central driver compartment and physically isolated from the first driver, wherein a first surface of the second driver is in contact with the at least one base wall and a second surface of the second driver is in contact with the second sidewall; and
- d. a cover adapted to engage the electronics housing to enclose the central driver compartment.

2. The electronics housing assembly of claim 1, wherein the at least one base wall comprises a first base wall portion and a second base wall portion separated from the first base wall portion by a gap, wherein the first driver is in contact with the first base wall portion and wherein the second driver is in contact with the second base wall portion.

3. The electronics housing assembly of claim 1, wherein the central driver compartment further comprises a third sidewall and wherein the first sidewall, the second sidewall, and the third sidewall form a triangle.

4. The electronics housing assembly of claim 3, further comprising a third driver positioned within the central driver compartment and physically isolated from the first driver and from the second driver, wherein a first surface of the third driver is in contact with the at least one base wall and a second surface of the third driver is in contact with the third sidewall.

5. The electronics housing assembly of claim 4, wherein the first driver, the second driver, and the third driver are arranged in a triangular configuration within the central driver compartment.

6. The electronics housing assembly of claim 3, wherein the first sidewall, the second sidewall, and the third sidewall define the compartment perimeter and wherein the compartment perimeter is triangular.

7. The electronics housing assembly of claim 1, wherein the first sidewall and the second sidewall are located on opposing sides of the central driver compartment.

8. The electronics housing assembly of claim 1, wherein the electronics housing further comprises at least one connecting wall spaced outwardly a distance from the central driver compartment and that connects at least some adjacent perimeter heat sink fins such that at least some of the air passageways are bounded by the adjacent perimeter heat sink fins, the connecting wall, and the central driver compartment.

9. The electronics housing assembly of claim 1, wherein the central driver compartment further comprises a plurality of base heat sink fins extending outwardly toward the compartment perimeter along an outer surface of the base wall.

10. The electronics housing assembly of claim 1, wherein at least one base heat sink fin laterally aligns with one perimeter heat sink fin when the electronics housing is viewed from the upper side toward the lower side.

11. The electronics housing assembly of claim 1, wherein the plurality of perimeter heat sink fins curves outwardly from the central driver compartment.

12. The electronics housing assembly of claim 1, wherein the electronics housing assembly is configured to couple to a first lighting subassembly to form a first light fixture.

13. The electronics housing assembly of claim 12, wherein the electronics housing assembly is configured to couple to a second lighting subassembly that is structurally different from the first lighting subassembly to form a second light fixture.

14. A light fixture comprising:

a. a lighting subassembly comprising:
   i. a chassis body having an upper side, a lower side, a chassis outer perimeter edge, and a central aperture extending from the lower side to the upper side such that air may pass through the central aperture upwardly from the lower side to the upper side of the chassis body, wherein an aperture edge defines the central aperture and a central aperture area; and
   ii. at least one LED module mounted on the lower side of the chassis body; and
b. an electronics housing having an upper side and a lower side and comprising:
   i. a central driver compartment having a compartment perimeter and comprising at least one base wall, a first sidewall, and a second sidewall, wherein the first sidewall and the second sidewall extend upwardly from the base wall; and
   ii. a plurality of perimeter heat sink fins extending outwardly from the central driver compartment, wherein adjacent perimeter heat sink fins define air passageways between the upper side and the lower side of the electronics housing and wherein the air passageways are adapted to receive air passing upwardly through the central aperture of the chassis body;
   iii. a first driver positioned within the central driver compartment such that a first surface of the first driver is in contact with the at least one base wall and a second surface of the first driver is in contact with the first sidewall;
   iv. a second driver positioned within the central driver compartment and physically isolated from the first driver, wherein a first surface of the second driver is in contact with the at least one base wall and a second surface of the second driver is in contact with the second sidewall; and
   V. a cover adapted to engage the electronics housing to enclose the central driver compartment.

15. The light fixture of claim 14, wherein the chassis body further comprises a plurality of chassis heat sink fins provided along the upper side of the chassis body and extending at least partially between the aperture edge and the chassis outer perimeter edge.

16. The light fixture of claim 14, wherein at least one chassis heat sink fin laterally aligns with at least one perimeter heat sink fin when the light fixture is viewed from above.

17. The light fixture of claim 14, wherein the electronics housing extends over only a portion of the central aperture area when the light fixture is viewed from below.

18. The light fixture of claim 14, wherein the electronics housing extends over the entire central aperture area when the light fixture is viewed from below.

19. An electronics housing assembly comprising:

a. an electronics housing having an upper side and a lower side and comprising:
   i. a central driver compartment having a compartment perimeter and comprising at least one base wall, a first sidewall, a second sidewall adjacent the first sidewall, and a third sidewall adjacent the first sidewall and the second sidewall, wherein the first sidewall, the second sidewall, and the third sidewall extend upwardly from the at least one base wall and form a triangular shape;
   ii. a plurality of perimeter heat sink fins extending outwardly from the central driver compartment, wherein adjacent perimeter heat sink fins define air passageways that extend between the upper side and the lower side of the electronics housing; and
   iii. at least one connecting wall spaced outwardly a distance from the central driver compartment and that connects at least some adjacent perimeter heat sink fins such that at least some of the air passageways are bounded by the adjacent perimeter heat sink fins, the connecting wall, and the central driver compartment;
b. a first driver positioned within the central driver compartment such that a first surface of the first driver is in contact with the at least one base wall and a second surface of the first driver is in contact with the first sidewall;
c. a second driver positioned within the central driver compartment and physically isolated from the first driver, wherein a first surface of the second driver is in contact with the at least one base wall and a second surface of the second driver is in contact with the second sidewall; and
d. a cover adapted to engage the electronics housing to enclose the central driver compartment.

20. The electronics housing assembly of claim 19, further comprising a third driver positioned within the central driver compartment and physically isolated from the first driver and from the second driver, wherein a first surface of the third driver is in contact with the at least one base wall and a second surface of the third driver is in contact with the third sidewall.

* * * * *